United States Patent [19]

Tokura et al.

[11] Patent Number: 5,469,428
[45] Date of Patent: Nov. 21, 1995

[54] LOOP-BACK SYSTEM IN A DUAL RING NETWORK

[75] Inventors: Nobuyuki Tokura, Yokosuka; Yoshio Kajiyama, Yokohama; Hideo Tatsuno; Takashi Nakashima, both of Yokosuka, all of Japan

[73] Assignee: Nippon Telegraph and Telephone Corporation, Tokyo, Japan

[21] Appl. No.: 858,364

[22] Filed: Mar. 25, 1992

[30] Foreign Application Priority Data

Mar. 26, 1991 [JP] Japan .................................. 3-087711
Jul. 22, 1991 [JP] Japan .................................. 3-181176
Jan. 21, 1992 [JP] Japan .................................. 4-008736

[51] Int. Cl.$^6$ ............................................. H04L 12/42
[52] U.S. Cl. .................. 370/161; 370/85.12; 340/825.01
[58] Field of Search ............................. 370/16.1, 15, 16, 370/85.12, 87, 24; 340/825.01, 825.05, 827; 379/5

[56] References Cited

U.S. PATENT DOCUMENTS

| 4,538,026 | 8/1985 | Yasue | 370/15 |
|---|---|---|---|
| 4,542,496 | 9/1985 | Takeyama et al. | 370/16.1 |
| 4,704,714 | 11/1987 | Tomizawa et al. | 370/15 |
| 4,710,915 | 12/1987 | Kitahara | 370/16.1 |
| 4,930,119 | 5/1990 | Kobayashi et al. | 370/16.1 |
| 4,999,832 | 3/1991 | Chen et al. | 370/85.14 |
| 5,105,188 | 4/1992 | Jung et al. | 370/16.1 |
| 5,150,356 | 9/1992 | Tsutsui | 370/16.1 |

Primary Examiner—Benedict V. Safourek
Assistant Examiner—Ajit Patel
Attorney, Agent, or Firm—Cushman, Darby & Cushman

[57] ABSTRACT

A loop-back recovery technique used when a failure takes place in a ring network, for transmitting information to a path indicated with a path ID number or the time slot position from a periodic frame. This is achieved by establishing working paths on one of the dual ring line between a transmission node and a receiving node thereof, establishing ring-formed protection paths in a ring line of the direction opposite to the working line, and making a loopback from the working paths to the corresponding protection paths at a node which detected the failure. The receiving node multiplexes the working and protection paths to receive data from either.

23 Claims, 17 Drawing Sheets

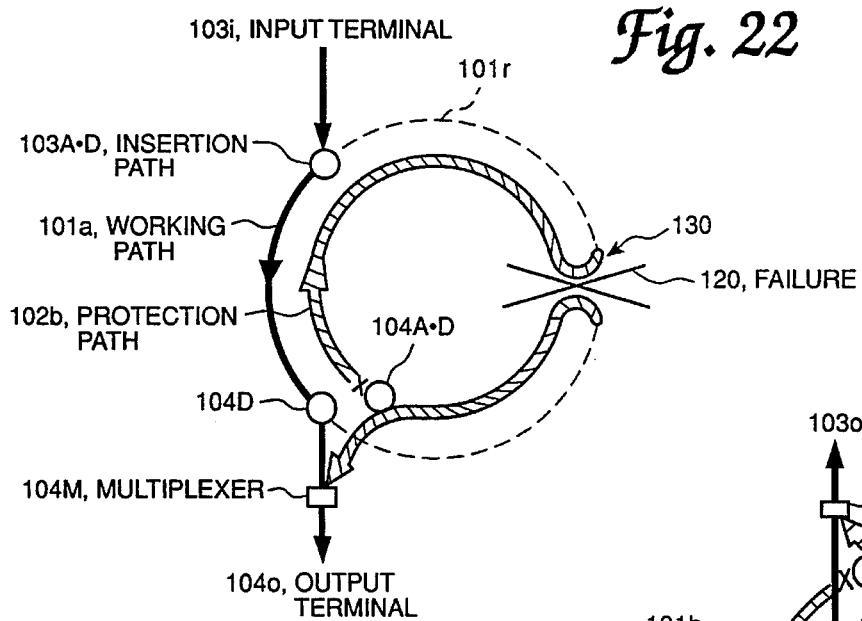
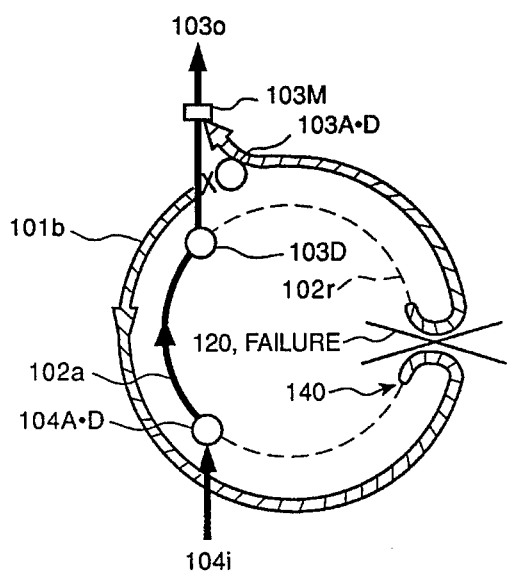
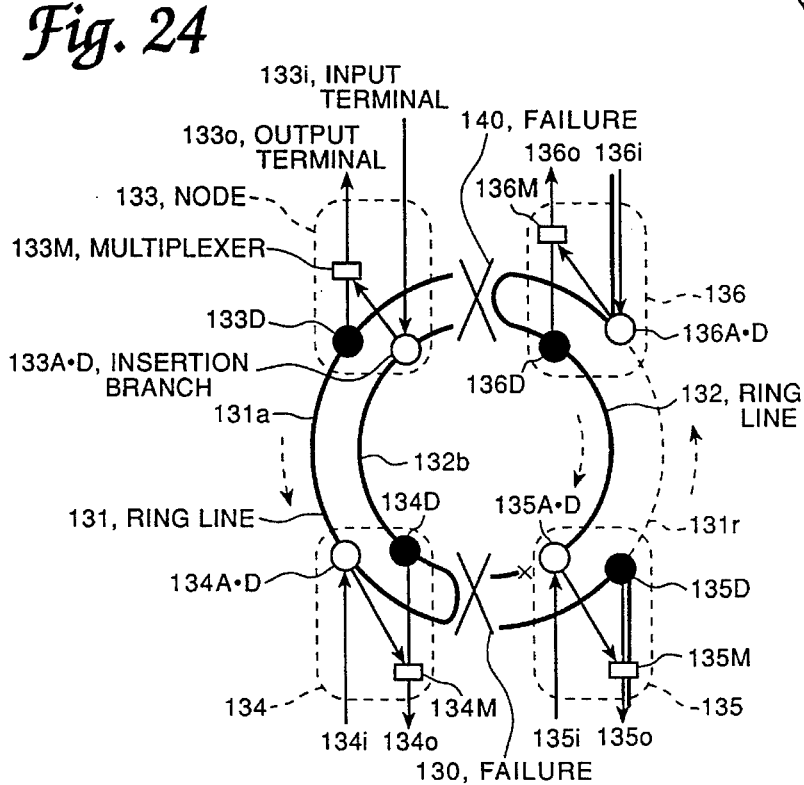

LOOP-BACK SYSTEM IN A DUAL RING NETWORK

BACKGROUND OF THE INVENTION

1. Field of the Invention

This invention is applicable to data transmission using a ring network, and more particularly it relates to a loop-back method for recovering a line from failure by loop-back in a ring line which transmits data in modes such as packets, ATM (asynchronous transmission mode) and STM (synchronous transmission mode).

2. Background of the Invention

FIGS. 25 and 26 are explanatory views to describe a prior art loop-back method used in a ring network. A ring network which connects four nodes with a dual ring line is exemplified herein for explanation.

The ring network has double ring lines, one of which is a counterclockwise ring used as a working line 111 and the other of which is a clockwise ring used as a protection line 112. Four nodes 113, 114, 115, 116 are arranged on the lines. Each of the nodes is provided with a node input terminal which is expressed by affixing i after its reference numeral, a node output terminal expressed by affixing o likewise to its reference numeral, an insertion into the ring line expressed by A (and by a white circle in the figure), and a branch in the ring line expressed by D (and by a black circle in the figure).

Description is made of restoring the line by reconfiguring using a loop-back when a transmission failure 150 takes place between the nodes 115 and 116 on the dual ring network of this structure. When a failure takes place, the node 113 on the ring (which is usually referred to as a ring monitor node) detects the failure and searches the nodes 115 and 116 between which the failure took place. Then, it recovers the line from failure by looping back the sides of the transmission line facing the failure between the two nodes 115 and 116 as shown in FIG. 26.

Such a technique, however, takes a very long time to accomplish because of the extremely complicated operations involved in the search for which terminals are the failing terminals on the lines 111 and 112. More specifically, the search usually starts from the monitor node (in this example, the node 113), and advances one farther node at a time by commanding loop-back at each adjacent node. It eventually determines the failed node as the one from which the loop-back signal has not returned and makes a loop-back for that node or one node before that node.

The operation sequence for searching the failed terminals will now be described.

The monitor node 113 connects the output thereof on the counterclockwise working ring line 111 with an input of the clockwise protection ring line 112. This makes the monitor node 113 a loop-back node. If it normally receives a signal from the protection line 112, it removes the loop-back, and then the monitor node 113 issues a loop-back command to the node 114 in order to extend the position at which loop-back occurs. When receiving the command, the node 114 connects the output thereof on the counterclockwise working ring line 111 with an input of the clockwise protection ring line 112. By this operation, the signal from the monitor node 113 is passed through the counterclockwise working ring line 111, looped back at the node 114 inserted into the clockwise protection ring line 112, and returned normally to the node 113. When the monitor node 113 receives the signal normally from the protection ring line 112, it cancels the loop-back command for the node 114. A similar operation is repeated for the node 115 by extending the loop-back node farther from the monitor node 113, and if the monitor node 113 receives a signal normally, it commands the node 116 into a loop-back mode. But since a failure 150 took place between the nodes 115 and 116, the signal will not be received normally from the line 112. This is either because the node 116 cannot receive the loop-back command or because the normal signal cannot be returned due to the failure 150 on the transmission line although the node 116 does configure as a loopback. In either case, since the normal signal is not returned, the node 113 sends a command to cancel the loop-back to the node 116, and sends a command for loop-back to the node 115 which is one node before the node 116. This makes the node 115 a loop-back node (LB1).

The technique repeats similar loop-back operations in the opposite direction (provided that the line on the output side of the node 113 is referred to as a protection ring line 112 and that on the receiver side as the working ring line 111). The first command configures the next node 116 as a loopback node so that the node 116 connects the clockwise line 112 with an input of the counterclockwise ring line 111 and the node 116 becomes a loop-back node (LB2). As shown in FIG. 26, this recovers the lines from the failure 150 by connecting the counterclockwise working ring line 111 which has been cut off between the nodes 115 and 116 due to the failure with the clockwise protection ring line 112 by means of the two loopback nodes 115 and 116.

As described in the foregoing, the loop-back operation in the prior art is highly complicated, involving a large number of difficult steps and therefore taking a lot of time for recovery from a failure.

This invention aims to solve the aforementioned defects encountered in the prior art and to provide a loopback method in a dual ring line which simplifies the recovery operation and requires less time.

SUMMARY OF THE INVENTION

This invention enables loop-back simply and quickly by establishing a working path on one of the dual ring lines and a protection path on the other line thereof in advance so that any node which detects a failure on the line makes a loop-back of the path by itself without checking all other nodes.

More particularly, the first aspect of this invention relates to a loop-back method for a dual ring network which loops back information to be transmitted by two ring lines each of which differs from one another in the direction for transmitting the information to a path indicated by the path identification (ID) number in, for example, an ATM system or the position of time slot in a STM system from frames. A working path is established between a transmission node and a receiver node on one of the dual ring lines, and a protection path of the form of an open ring on which output information is not connected to the input of its ring is established on the ring line of the direction opposite to one of the working paths to extend from the receiver node or a node which is one node upstream thereto on the working path to the receiver node. The protection path is multiplexed on the receiver terminal of the working path corresponding to the receiver terminal thereof, and that the node which detects a failure taking place on the transmission lines makes a loop-back from the working path to a corresponding protection path.

Working and protection paths are established by writing labels in a table of each node which is called a link map. For example, in the case of ATM, the destination of where to output each inputted cell is written in the link map corresponding to the path ID number. Therefore, unless an established path is actually used for communication, it is not necessary to allocate paths assuming that all the working paths of the network are looped back at the same time. This allows more efficient use of the transmission capacity as compared with STM. Working paths may be established on a predetermined line of the two ring lines or either one of the lines selectively.

Loop-back may be conducted either in the unit of a line or of a path. When loop-back is conducted in the unit of a line, all paths on one transmission line are looped back to the corresponding paths on the other transmission line. In such a case, it is preferable to allocate the same number or the same position to a protection path as the path ID number or the time slot indicating the corresponding working path. When conducting in the unit of a path, the number or position assigned may be identical or different.

When the loop-back is made in the unit of a path, each path is looped back separately. In such a case, loopback may be conducted without differentiating working paths from protection paths. It is preferable, however, to differentiate them and to discard the protection paths in order to loopback the working paths alone.

It is also preferable to discard the protection paths inputted from the side of the line where a failure has been detected.

The loop-back may be made only at a node at the upstream to the failed line or may be made at nodes on both sides of the failed line.

The second aspect of this invention relates to a ring network to realize the above mentioned method comprising at least two ring lines each of which has transmission directions opposite to one another, and plural nodes arranged on the two ring lines, each of the plural nodes including a means to connect transmitted information to a path indicated by the path ID number or the time slot position from the periodic frame of the information. The two ring lines are so structured that one of them is established with a working path between a transmission node and a receiving node, and the other ring line having a direction opposite to the working path is established with a protection path of the form of an open ring extending either from a receiving node, or a node one node upstream thereto on the working path, to a receiving node and having a receiver end multiplexed on the receiver terminal of the working paths. Each node is provided with a means for looping back the information on a working path established on the failed line to a protecting path corresponding thereto when a failure is detected on a transmission line.

Each protection path is established in advance on a ring of the opposite direction to the working path, and the protection path is cut off with a node on the receiver side. When a failure takes place on the line, a node which detects the failure loops back signals from the working path to the protection path. The looped-back information is transmitted to the node on the receiver side through the ring line of the opposite direction to the corresponding working path. The receiver node outputs the receiver output by multiplexing the receiver side terminal of the protection path with the receiver terminal of the working path.

This system enables, in sum, detection of a failure and a loop-back therefore easily and quickly by using nodes without the need for issuing recovery commands from a monitoring node.

A path may be established in either of the two manners mentioned below:

(1—1): One of the ring lines is established with the working paths alone while the other of the lines is established with the protection paths alone.

(1-2): Each of the working paths is established independently and selectively on either one of the ring lines. A unit of loop-back may be either one of the below:

(2-1): A unit of a line (2—2): In the unit of a path but not differentiating the working paths from the protection paths.

(2-3): In the unit of a path and only the working paths are looped back and the protection paths are discarded.

(2-4): In the unit of a path, the protection paths from the failed side are discarded.

A loop-back point may be either one of the below:

(3-1): Only the upstream end of the failed transmission line.

(3-2): Both ends of the failed transmission line.

They may be combined as below:

| | |
|---|---|
| i | (1-2), (2-1) or (2-2), (3-1) |
| ii. | (1-2), (2-1) or (2-2), (3-2) |
| iii. | (1-1), (2-3) or (2-4), (3-1) |
| iv. | (1-1), (2-3) or (2-4), (3-2) |
| v. | (1-2), (2-1), (3-1) |
| vi. | (1-2), (2-1), (3-2) |
| vii. | (1-2), (2-3) or (2-4), (3-1) |
| viii. | (1-2), (2-3) or (2-4), (3-2) |

However, the combination v cannot be used as it makes the recovery impossible. In the cases i and iii, only the transmission line where a working path has been established is looped back.

Preferred embodiments will now be described by referring to the attached drawings.

BRIEF DESCRIPTION OF THE DRAWINGS

FIG. 22 is a view to show an example of a failure which takes place on a protection path of a downstream clockwise ring transmission line.

FIG. 23 is a view to show an example of a failure which takes place on a protection path of an upstream counter-clockwise ring line.

FIG. 24 is a view to show an example of a recovery of double failure where a loop-back from a protecting path toward s working path is not made.

DETAILED DESCRIPTION OF THE INVENTION

Figure 1:
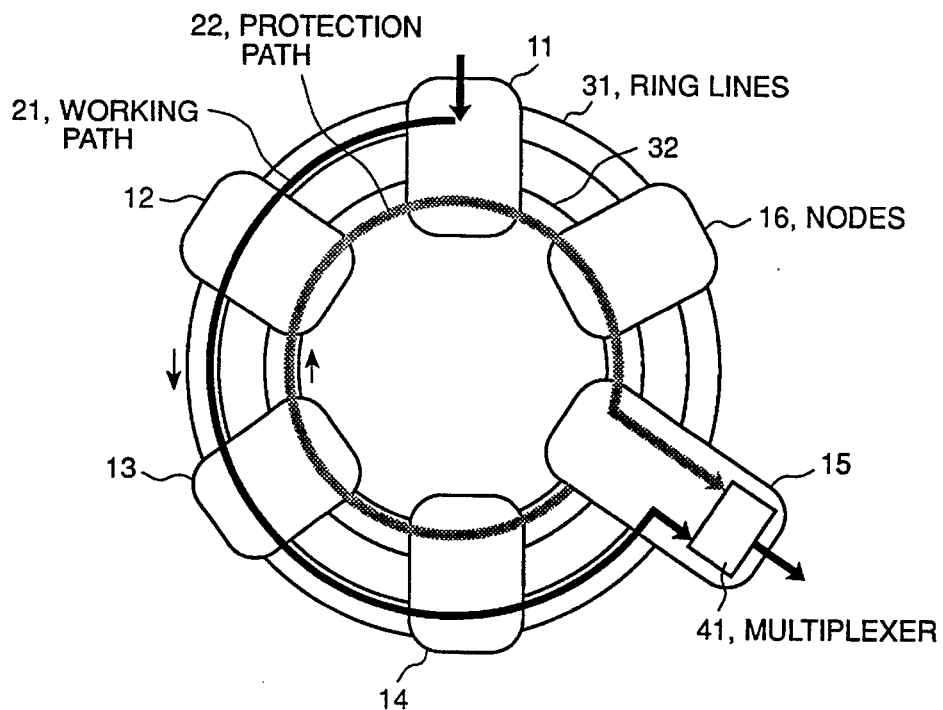
FIG. 1 shows an example of a protection path establishment where a protection path is established for one cycle of an s ring transmission line according to this invention.
Figure 2:
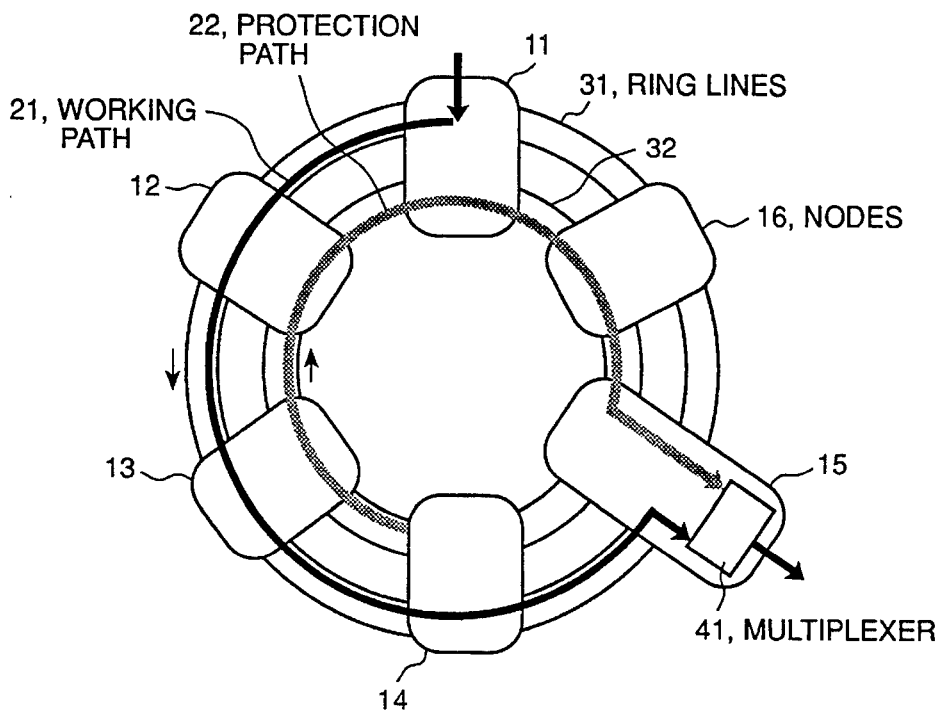
FIG. 2 shows an example of a path establishment where an s protection path is established from a node which is one node upstream to the above on the side of the working path.

FIGS. 1 and 2 show examples of path establishment embodying this invention where paths are set up in the ring network with six nodes. FIG. 1 shows an example of a protection path establishment for one cycle of the ring while FIG. 2 shows an example of a protection path from a node which is one node upstream to the one of FIG. 1 on the working path.

The ring network has two ring lines 31 and 32, having opposite transmission directions, for conveying information to the path indicated by the path ID number or the time slot position from the periodic frame. Plural nodes 11–16 (six in this case) are arranged on the two ring lines 31, 32.

If the node 11 is a transmission node and the node 15 a receiving node in the ring network, for example, a working path 21 is established between the transmission and receiving nodes on the ring line 31. A protection path 22 is set up in the form of an open ring on the line 32 starting from the receiving node 15 in the case of FIG. 1 and from a node 14 which is one node upstream thereof on the working paths in FIG. 2 and terminating at the receiving node 15. Multiplexer 41 multiplexes receiving terminals from working path 21 and receiving path 22. Any commercially available two-line multiplexer can be used for this purpose. The same number or the same position as the corresponding working path 21 is allocated to the protection path 22 as the ID number or the time slot position.

Paths may be established either by setting only the working paths on one of the ring transmission lines and only the protecting paths on the other line or by setting each working path independently and selectively on either one of the lines.

Figure 3:
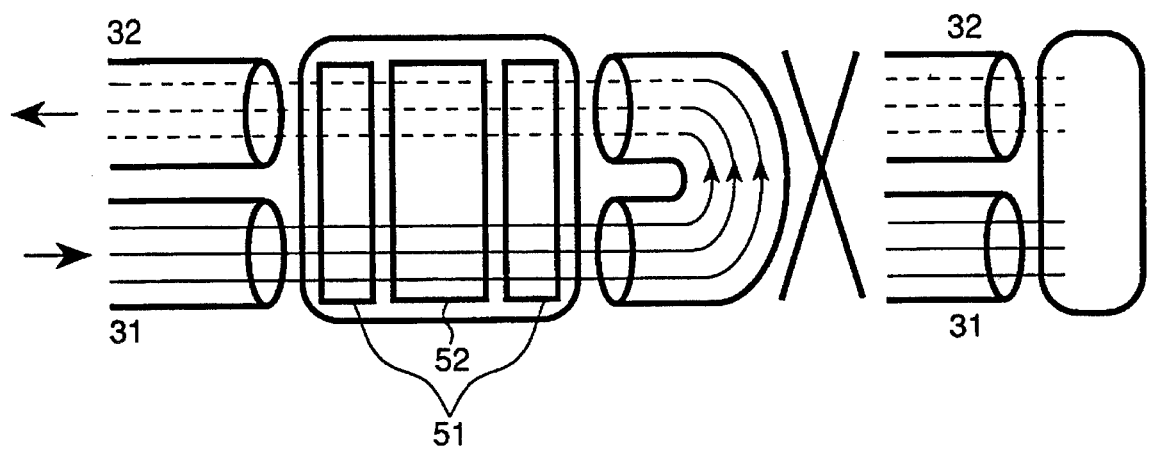
FIG. 3 is a view to show loop-back in the unit of a transmission line made by looping-back the respective lines.

There are three cases to detect a failure in the working path:

Case 1: Loop-back of all of the transmission lines: In FIG. 3, when a loop-back is made by a node(A) which has detected the receiving signal is not normal, the signal transmitted from the node(A) is interrupted. Then the node(B) that recieved the signal detects an abnormal condition. Node(B) therefore commands a loop-back. That is, both nodes(A) and (B) are configured to loop-back conditions respectively.

Case 2: Using a maintenance signal of the transmission line: The maintenance signal between two nodes (a section) is defined in G709-2.3.1 of the recommendation of CCITT in 1990. The maintenance signal failure of the receiving signal at the node(B) is transmitted back to the node(A), and this is defined as FERF (Far End Received Failure). The node(A) may detect a failure of the transmission line by the FERF. That means the nodes at both sides of the point failure can loop-back respectively.

Case 3: When working paths are assigned for both rings: When working path(s) on one ring transmission line have not been set, the node(A) that received the working path(s) detects failure and commands loop-backs. Then paths on another ring transmission line do not arrive at the node(B), which detects a failure and also configures loopbacks.

Figure 2A:
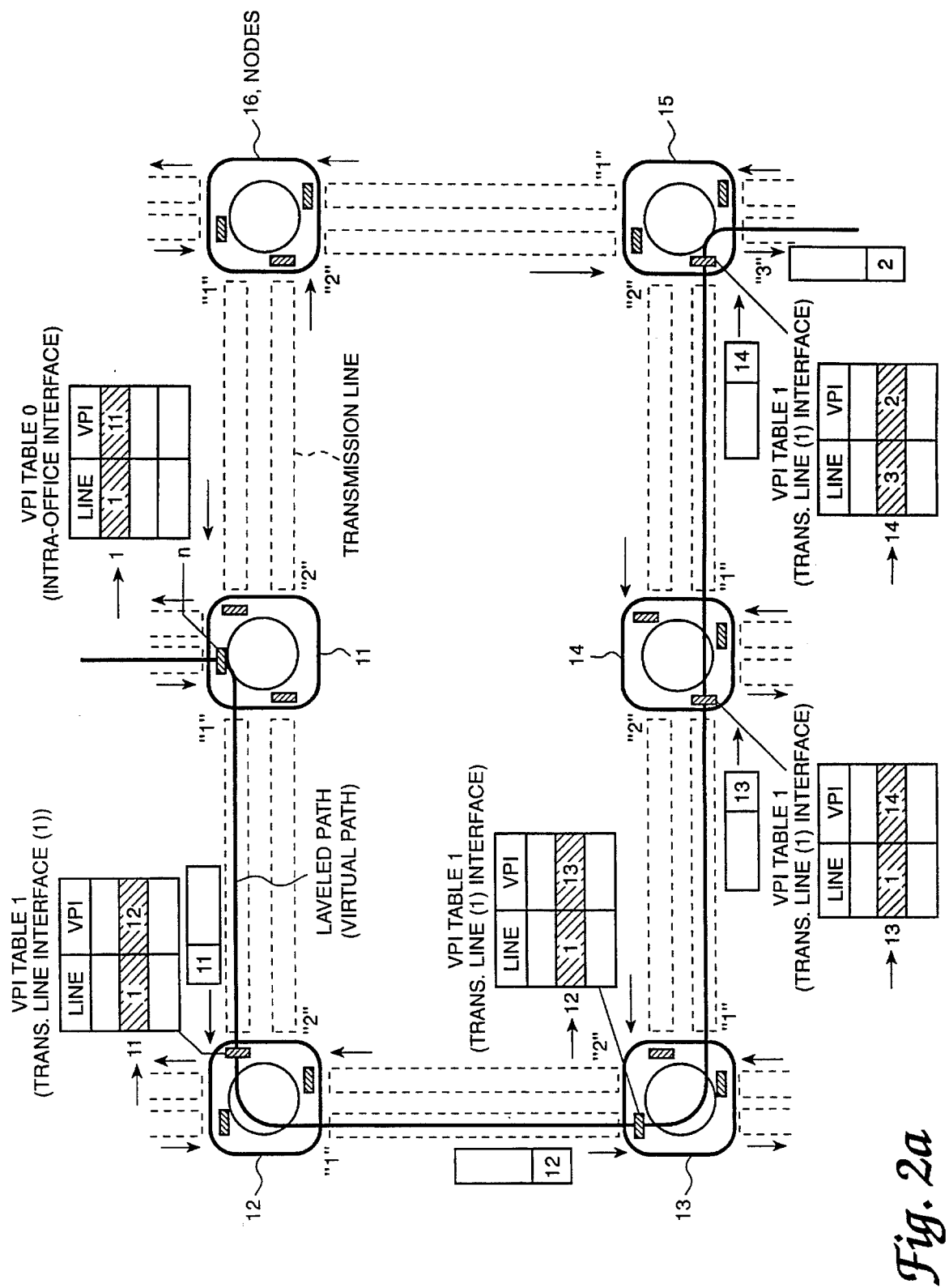
FIG. 2a shows an example on ATM.

FIG. 2a shows an example of a path establishing procedure in an ATM network including 6 nodes 11 through 16.

Each node includes a link map to store output lines and output paths (virtual paths) and different ID, e.g., 21 might indicate transmission to node 16.

Figure 2B:
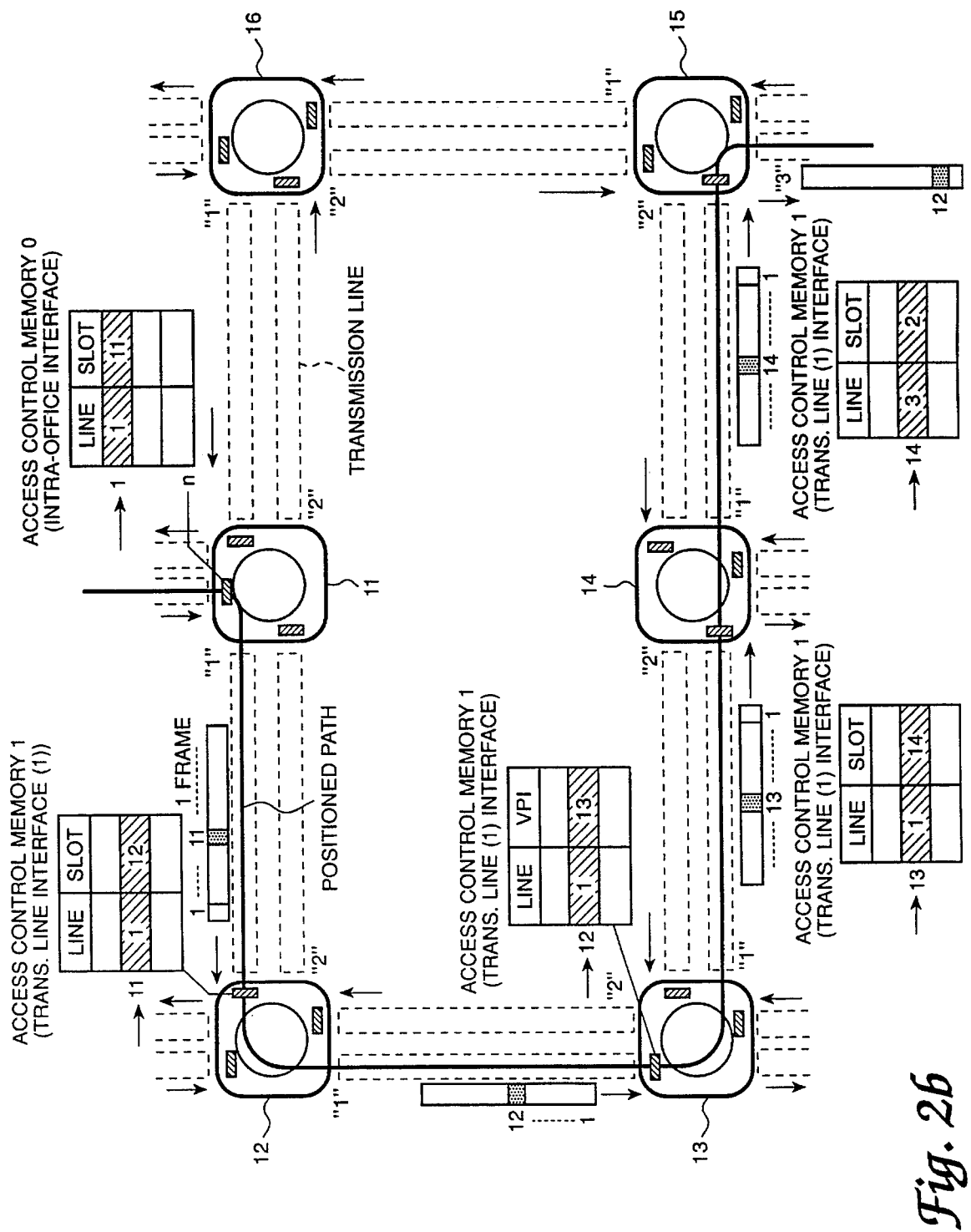
FIG. 2b shows an example on STM.

FIG. 2b shows an example of a path establishment in an STM network.

In STM, a time slot position in a periodic frame is used to identify a path, and link maps store output lines and output time slots corresponding the time slots of the input frame. If the line number "a" and the slot number "b" are stored in the map corresponding to the "c-th" slot of the input frame, the information in the c-th slot of the input frame are transmitted by the b-th slot of the output frame on the line "a". In STM, link maps are called "Access Control Memory" instead of "VPI table". The process for path dedication is identical to that of ATM.

Figure 4:
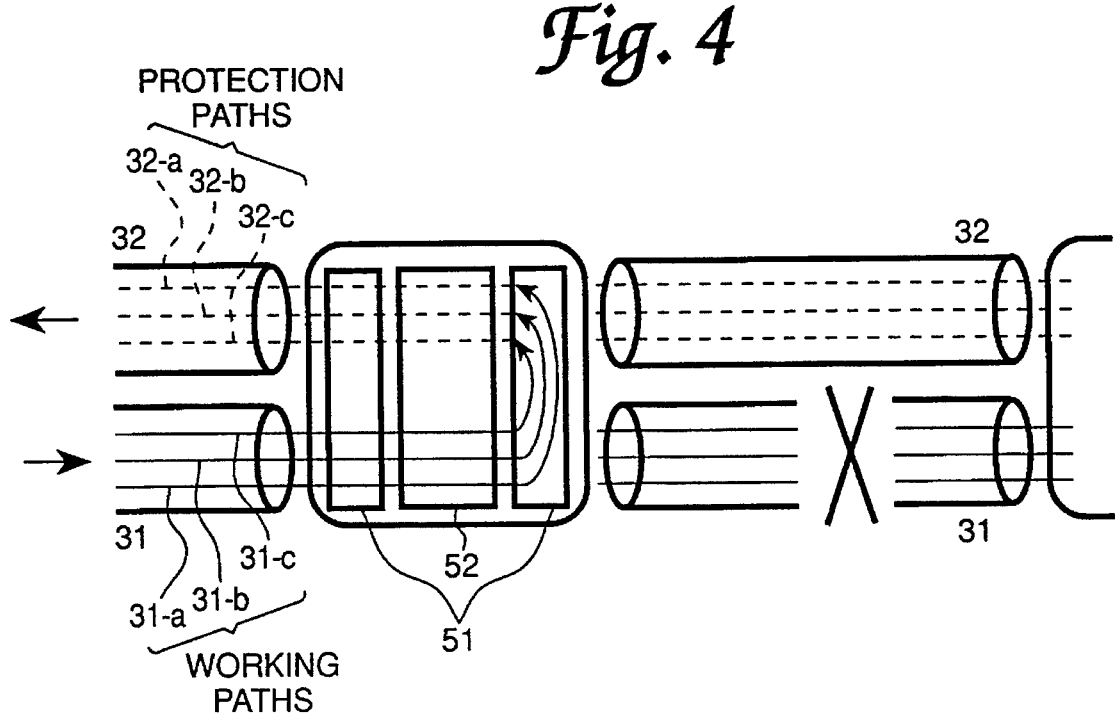
FIG. 4 is a view to show loop-backs in the unit of a transmission line with a loop-back switch.
Figure 5:
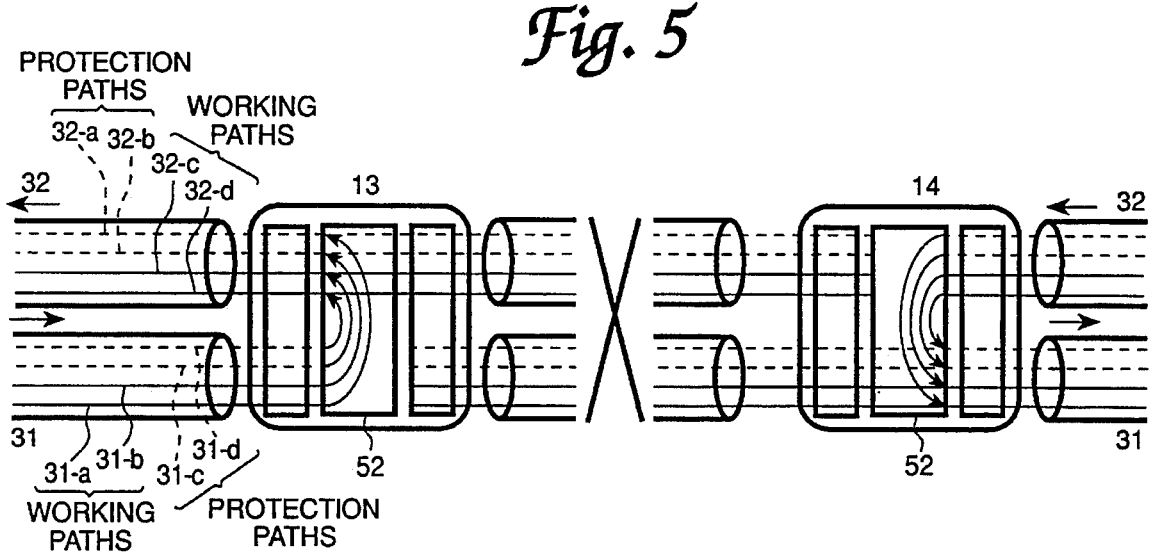
FIG. 5 is a view to show loop-backs in the unit of a path without differentiating the working paths from the protection paths.
Figure 6:
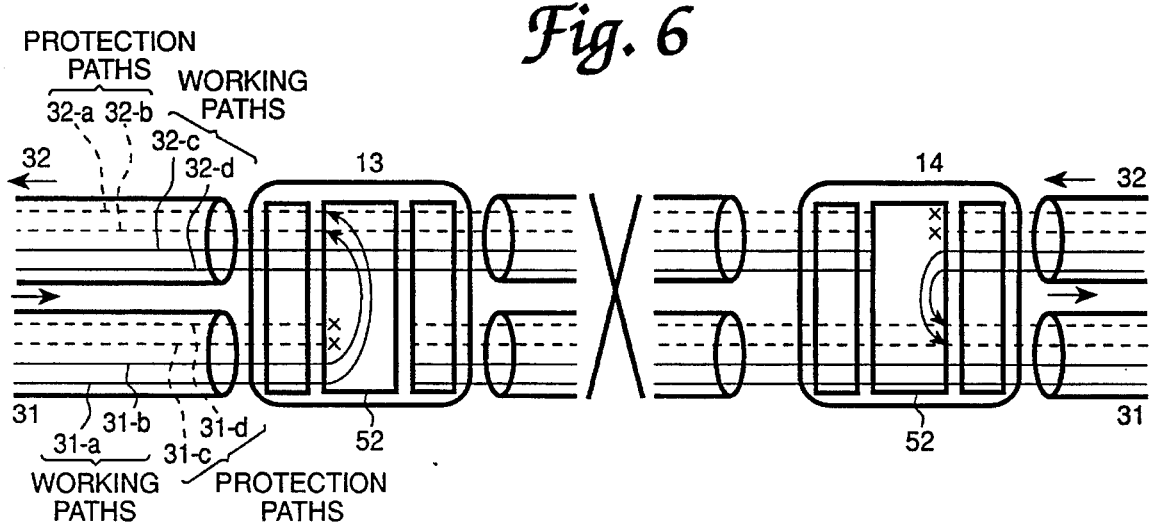
FIG. 6 is a view to show loop-backs in the unit of a path by discarding the protection paths.
Figure 7:
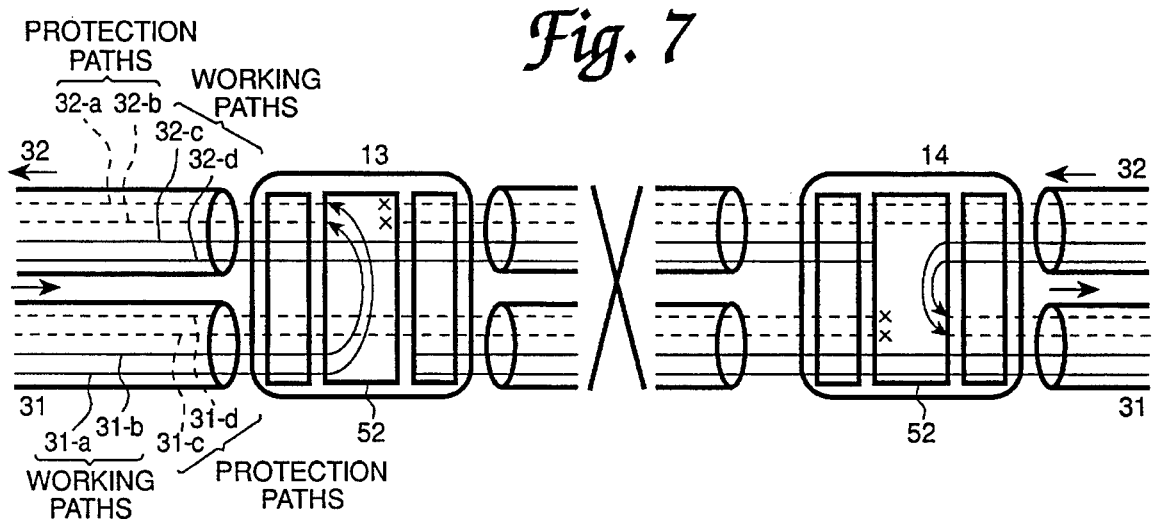
FIG. 7 is a view to show loop-backs in the unit of a path where the protection paths from the failed side are discarded.

FIGS. 3 through 7 are views to show differences in the loop-back methods depending on the unit in which loop-back is performed. More particularly, FIGS. 3 and 4 show the loop-back in the unit of a line where all paths on one transmission line are looped back to the corresponding paths on the other transmission line and FIGS. 5 through 7 show it in the unit of a path (where each path is separately looped-back). In the loop-back method for the unit of a line, a line allows itself to be looped back for connection as shown in FIG. 3. It is preferable to use a loop-back switch 51 in a node as shown in FIG. 4.

The loop-back in the unit of a path may be made by using a path switch 52 in the node. Description will now be given to the operation of the node 13 when a failure takes place between the nodes 13 and 14. The method shown in FIG. 5 does not discriminate the working paths from the protection paths, so both the working path 31a and 31b on the ring line 31 are looped back to the protection paths 32a and 32b on the line 32 which are indicated by the same path ID numbers, or the same time slot positions and the protection paths 31c and 31d on the line 31 are similarly looped back to the working paths 32c and 32d on the line 32. The method shown in FIG. 6 discriminates the working paths from the protection paths, the working paths 31a and 31b alone are looped back and the protection paths 31c and 31d are discarded. According to the method shown in FIG. 7, the protection paths from the failed side are discarded.

Figure 8:
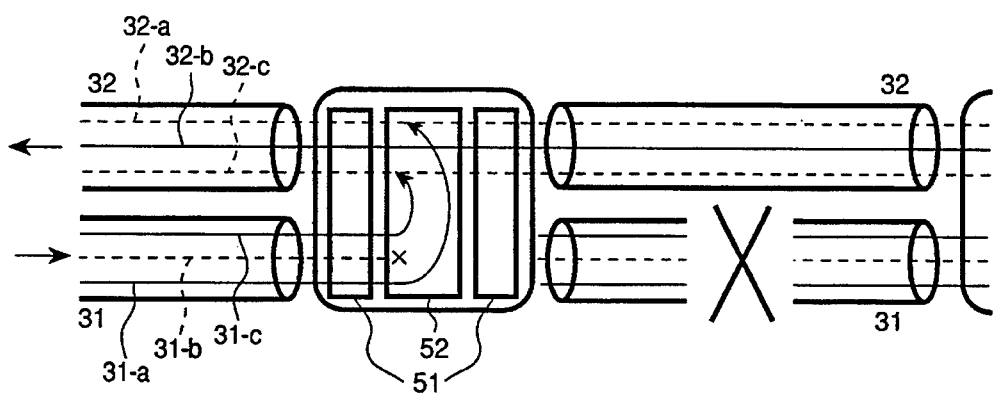
FIG. 8 is a view to show loop-backs which are made only at from the upstream end to the failed transmission line.
Figure 9:
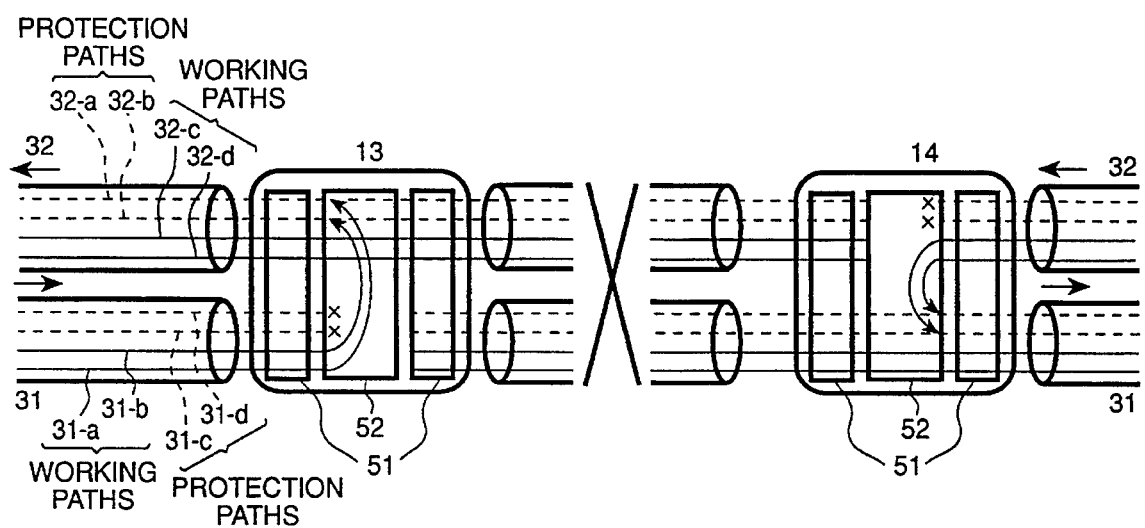
FIG. 9 is view to show loop-backs made on both sides of the failed line.

FIGS. 8 and 9 show the loop-back points. FIG. 8 shows a case where loop-back is conducted only on the upstream end to the failed line while FIG. 9 shows the case to conduct loop-back on both ends. When loop-back is conducted at only the upstream terminal, working paths on the other line where no failure takes place, i.e. the line 32 in the case shown in FIG. 8, is not looped back.

FIGS. 10–14 show examples of recovery by a combination of path establishment, a loop-back unit and a loop-back point when the transmission line failed under the path establishment conditions shown in FIG. 1.

Figure 10:
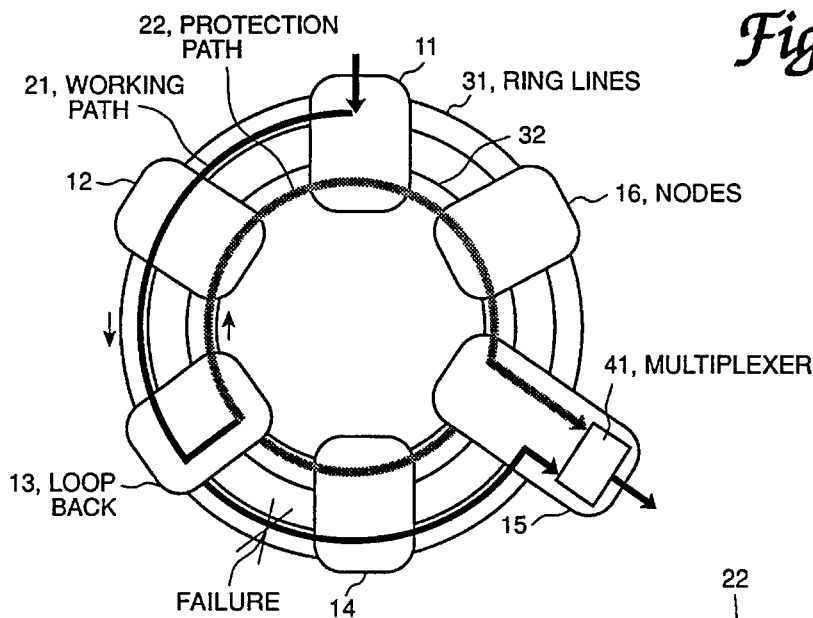
FIG. 10 is a view to show an example of recovery made at an upstream end to the failed location alone either in the unit of a line or without differentiating working paths from the protection paths.

FIG. 10 shows a recovery when a loop-back is made on the upstream terminal to the failed point alone without discriminating the transmission unit or the working paths from the protection paths; i.e. the combination i above. This method is used to establish the working paths of only the ring transmission lines. For example, when a failure takes place between the node 13 and the node 14 on the line 31, the working path 21 on the line 31 is looped back at the node 13 to a protection path on the line 32.

Figure 11:
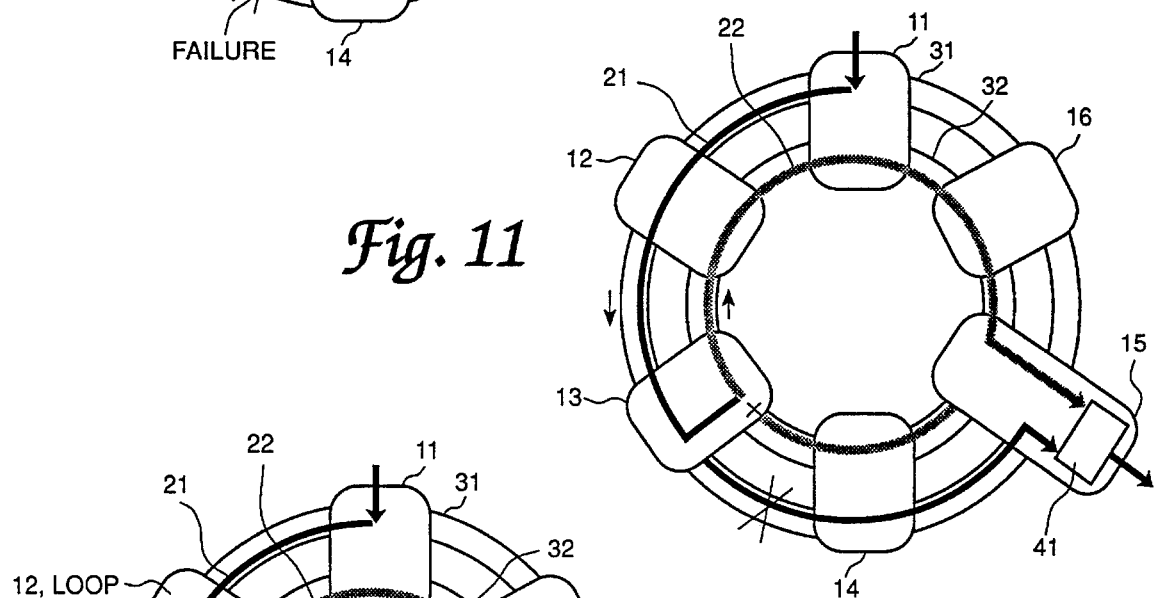
FIG. 11 is view to show an example of recovery made with a loop-back only at an end upstream thereto in the unit of a path.

FIG. 11 shows a case of recovery where a loop-back is made in the unit of a path only at the upstream terminal or the combination iii or vii above. In this case, the working paths alone are looped back by and maintained differentiated from the protecting paths. It is preferable to discard the protection paths from the failed line side.

Figure 12:
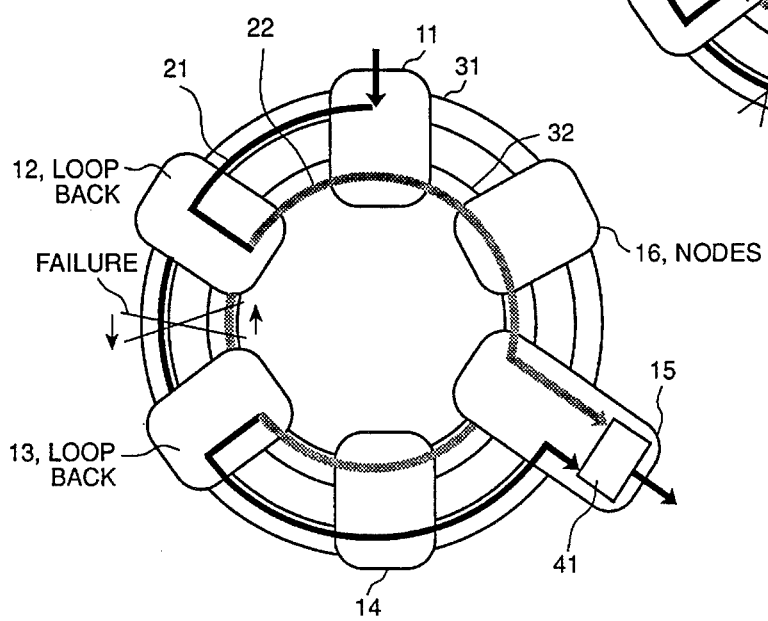
FIG. 12 is a view to show an example of recovery with loop-backs on both sides of a failed point either in the unit of a line or without differentiating the working paths from the protection paths.

FIG. 12 shows the recovery where a loop-back is made at both sides of the failed point without discriminating working paths from the protection path; i.e. the combination ii or vi. When a failure takes place between the node 12 and the node 13, the nodes 12 and 13 make loop-backs respectively.

Figure 13:
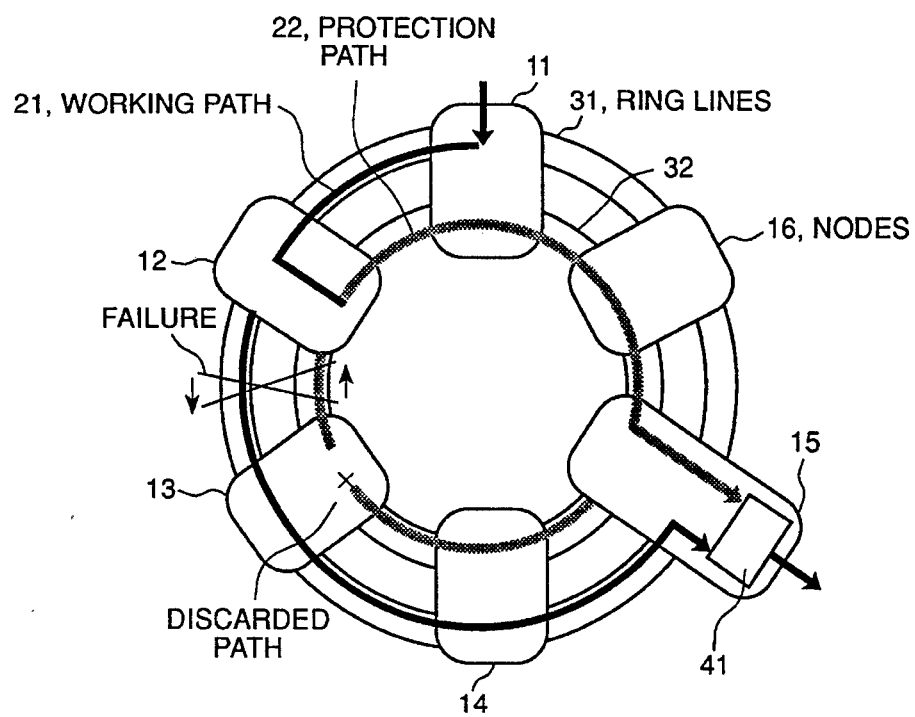
FIG. 13 is a view to show an example of recovery where loop-backs are made in the unit of a path at both ends of a failed point, and the protection paths toward the failed point are discarded.
Figure 14:
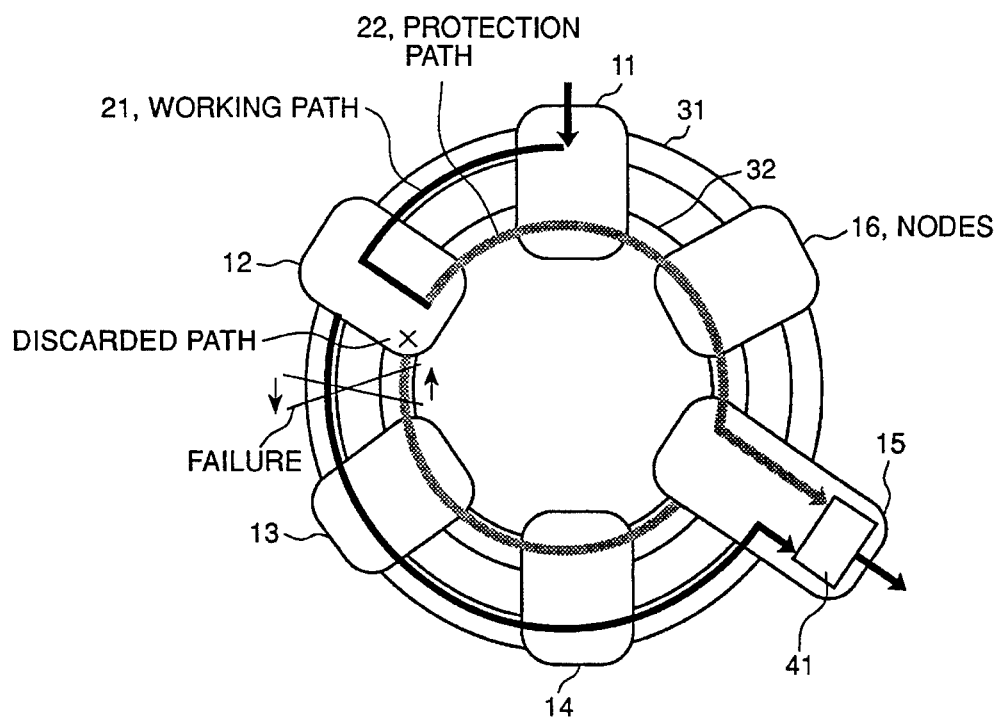
FIG. 14 is a view to show an example of recovery made with loop-backs on both sides of a failed location and discarding the protection paths from the failed side.

FIGS. 13 and 14 show recovery cases where loop-backs are made at both sides of a failed point in the unit of a path; i.e. the combination iv or viii. FIG. 13 shows the case where a protection path 22 toward the failed point between the nodes 12 and 13 is discarded at the node 13 which is on the upstream side of the path while FIG. 14 shows the case where a protection path from the side of the failure is discarded at the node 12.

Figure 14A:
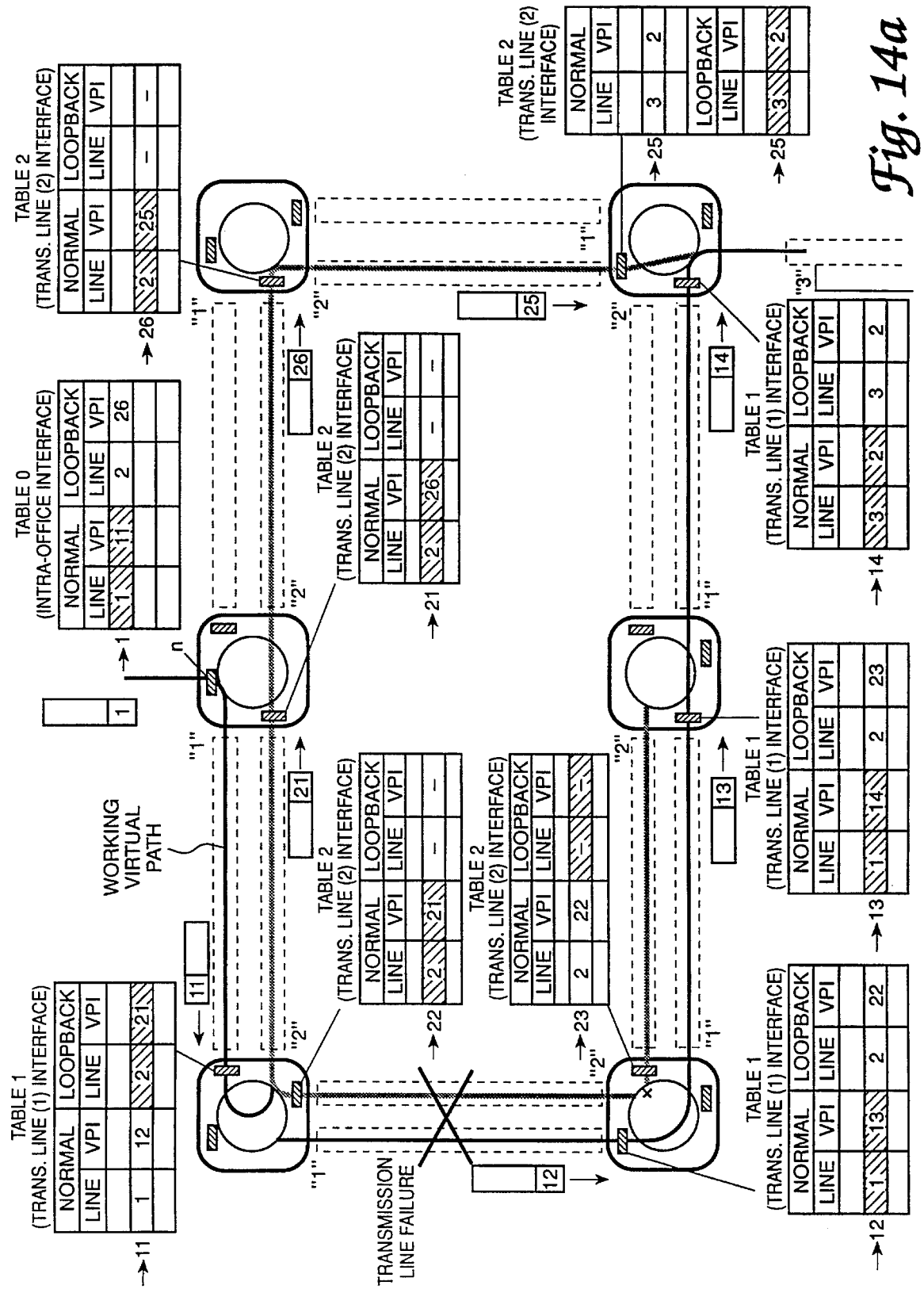
FIG. 14a shows an example on ATM.
Figure 14B:
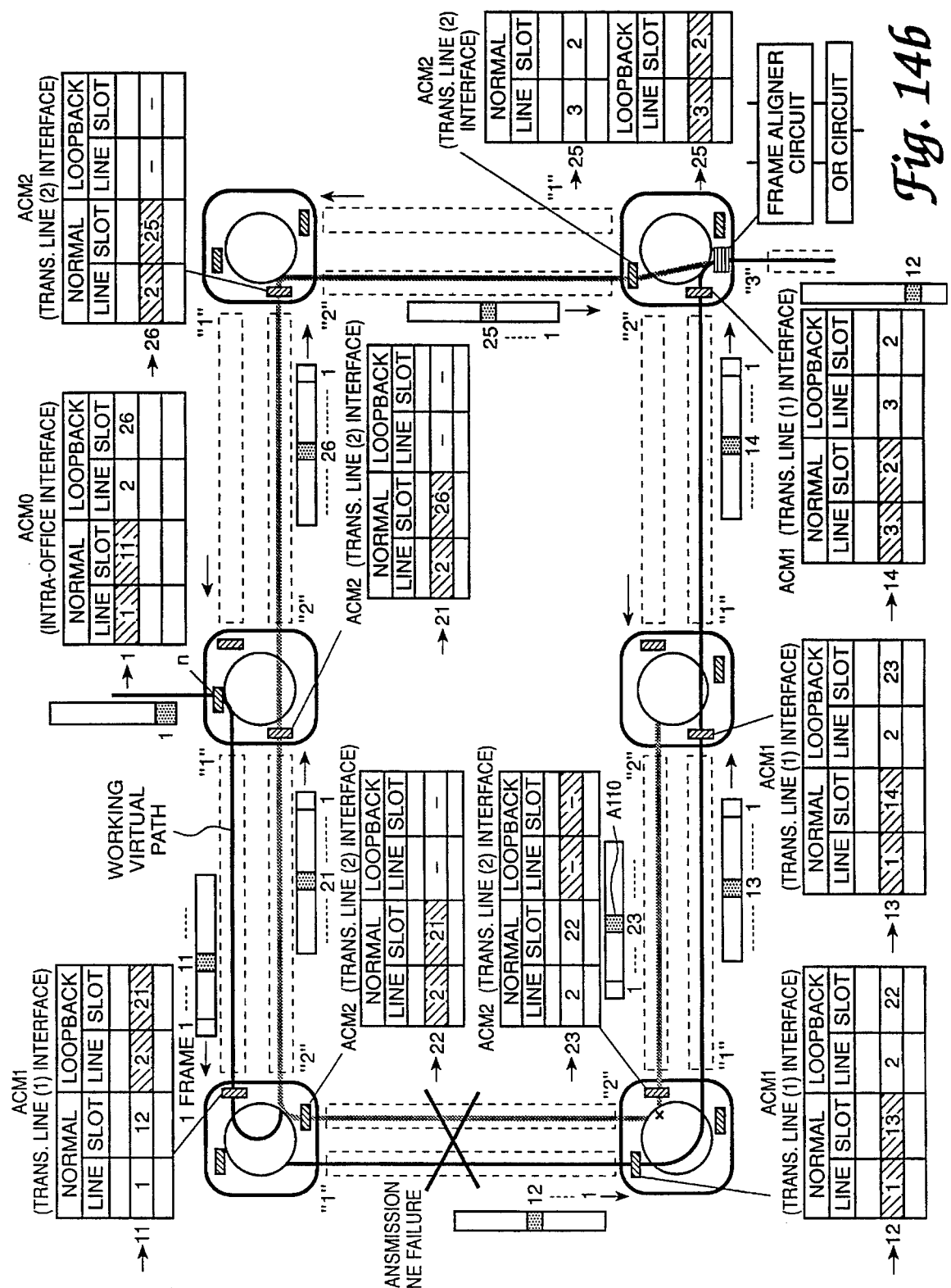
FIG. 14b shows an example on STM.

FIG. 14a and FIG. 14b show examples for embodying the path establishment shown in FIG. 13 or FIG. 14. FIG. 14a is an example on ATM and FIG. 14b is on STM. In both cases, each link map stores one output line and one output path for a normal case and another line and another path for loop-back for each cell or each time slot which is input to the link nap. If no output line or no output path is written in the link map, corresponding path is discarded.

In the destination node 15, two pieces of information, one from the working path and another from the protection path, are added logically. In the case of STM, time slots of the information are not identical, so that a frame aligner circuit and an OR circuit are provided in each node.

Figure 15:
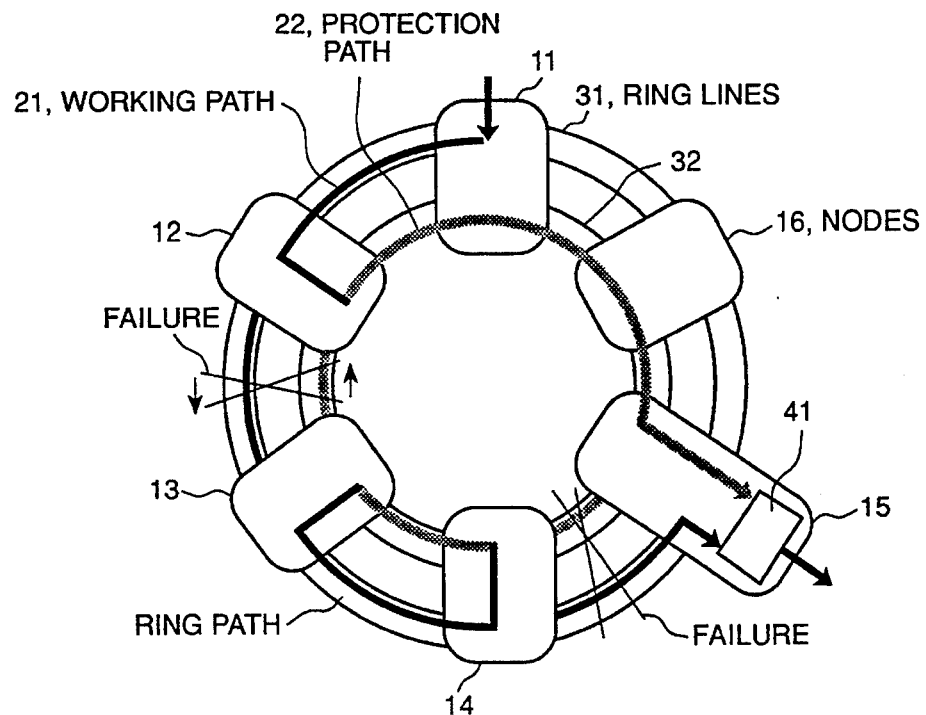
FIG. 15 is a view to show an example of double failures where a ring path is generated.
Figure 16:
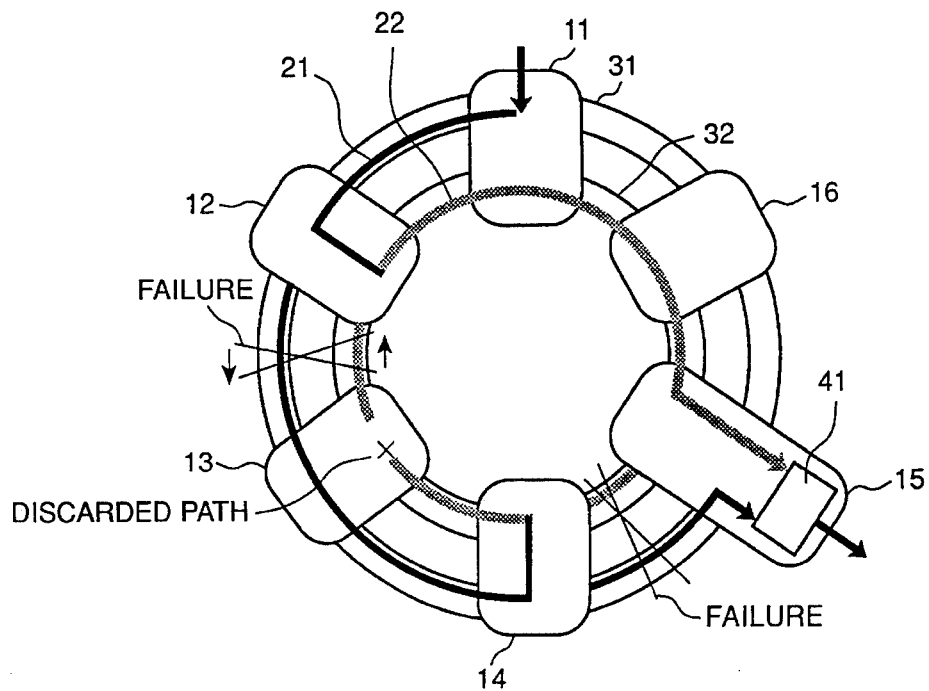
FIG. 16 is a view to show an example of recovery from double failures where generation of ring paths is prevented.

FIGS. 15 and 16 show recovery cases from double failures. Under the conditions shown in FIG. 1, when a transmission line failure takes place between the nodes 12 and 13 and between the nodes 14 and 15, a ring path can possibly be made from the node 13 to the counterclockwise ring line 31 to the node 14 and then back to the clockwise line 32 to the node 13, as shown in FIG. 15. This happens according to the loop-back method which does not discriminate the transmission units or the working paths from the protection paths. In order to avoid such a connection, each of the nodes 11 through 15 should be structured to discriminate the working paths from the protection paths and to discard the protection paths at the node 13 which has detected the transmission line failure as shown in FIG. 16.

Figure 15A:
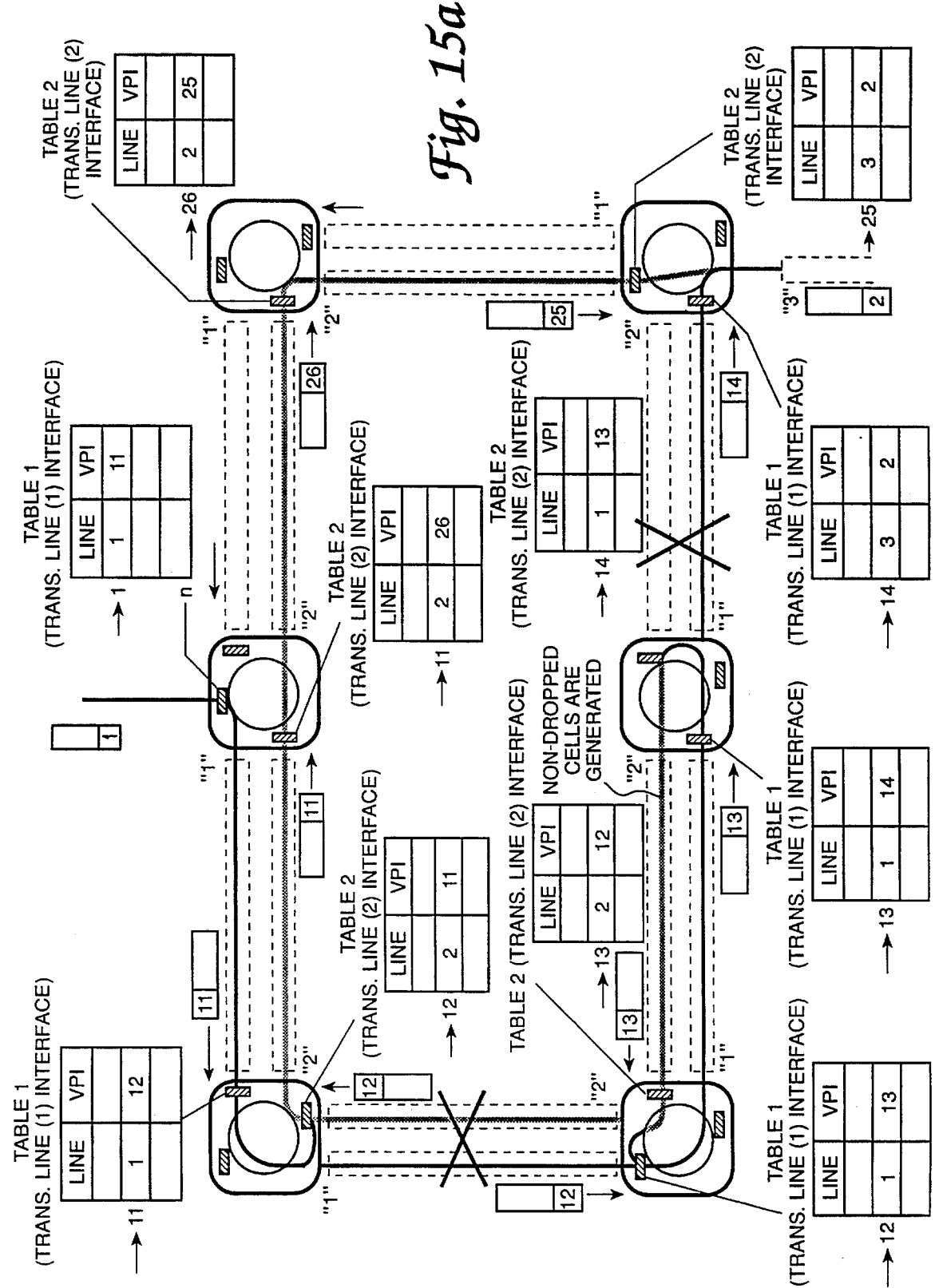
FIG. 15a shows an example on ATM.
Figure 16A:
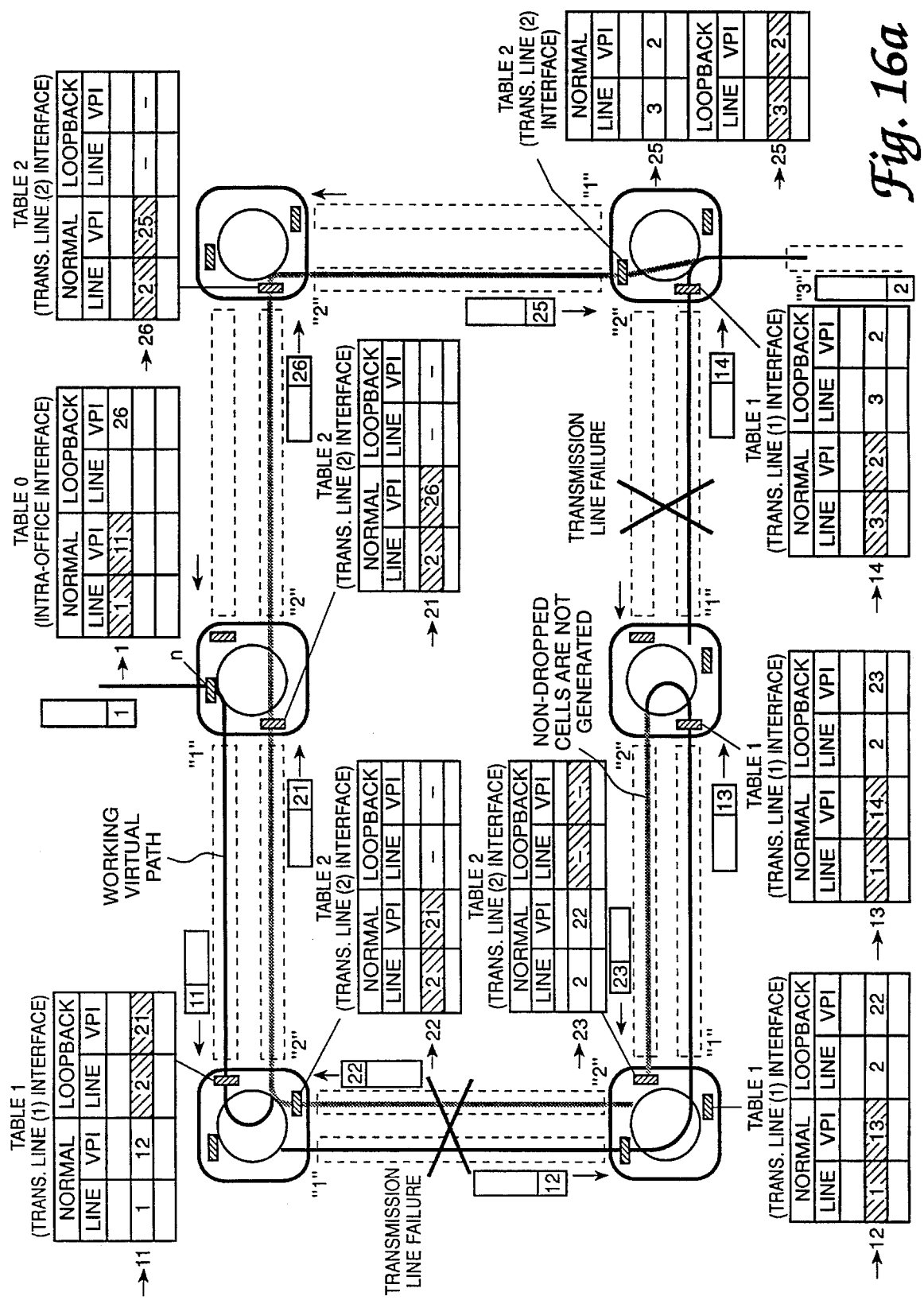
FIG. 16a shows an example on STM.

FIG. 15a and FIG. 16a show examples for embodying the examples shown in FIG. 15 and FIG. 16 respectively on ATM.

The method and sequence of loop-back operation will be described in more detail below.

Figure 17:
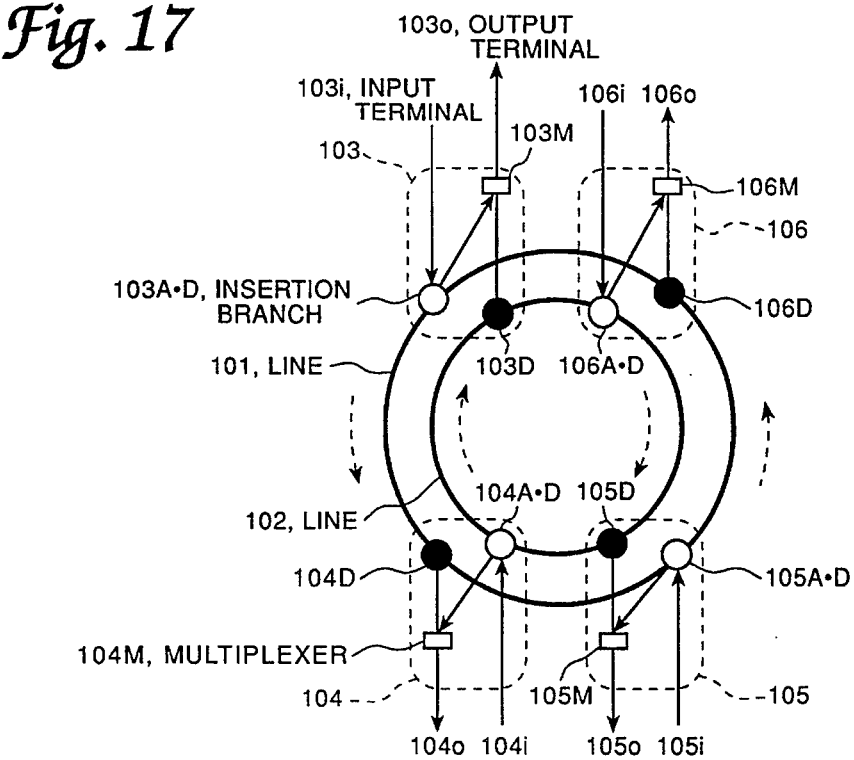
FIG. 17 is a view to show an example of establishment of a path and a loop-back specifically wherein loop-backs are made in the unit of a line.

FIG. 17 shows the structure of a ring network where four nodes are arranged and connected on dual lines. The method is described herein for the case when a loop-back is made in the unit of a line.

The ring network is provided with a counterclockwise line 101 and a clockwise line 102, and nodes 103 through 106 are arranged on the lines. Each of the nodes has a node input terminal expressed with a suffix i to indicate the node number, a node output terminal with a suffix o, an insertion branch for inserting in a ring line or branching from a line with suffixes A.D, a branch of the line with a suffix D and a multiplexer combining a working path with a protection path with a suffix M.

(1) An example of establishing on the dual ring lines an upstream working path and a downstream working path.

In FIG. 17, a packet or a cell (an information unit is called a packet in packet communication and a cell in ATM; this invention is applicable to either technique) is transmitted between the node 103 and the node 104 either by a downstream working path running from an input terminal 103; of the node 103 to an insertion branch 103A.D to a counterclockwise ring line 101, to a branch 104D, to the multiplexer 104M, and to the output terminal 104o or by an upstream working path running from the input terminal 104; of the node 104 to the insertion branch 104AD, to the clockwise line 102, to the branch 103D, to the multiplexer 103M, and to the output terminal 103o of the node 103.

Figure 18:
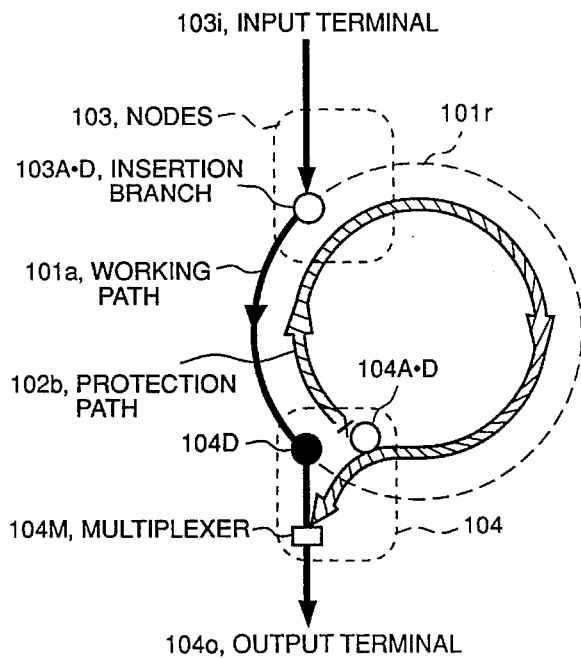
FIG. 18 is a view to show establishment of downstream working paths and protection paths.
Figure 19:
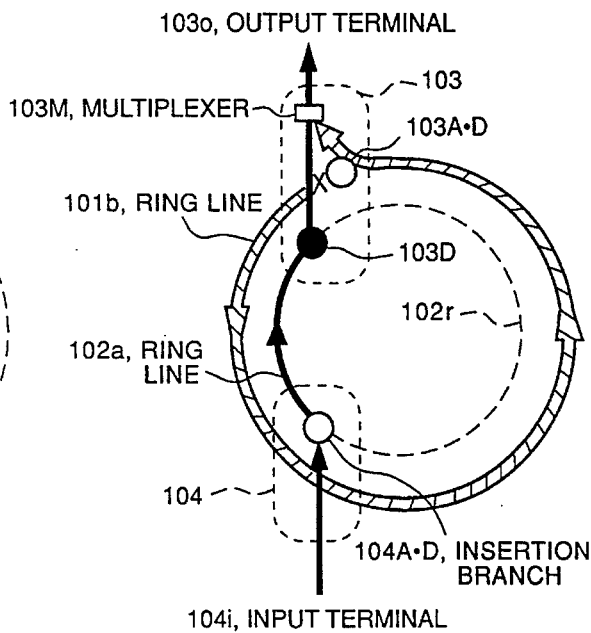
FIG. 19 is a view to show an example of establishment of upstream working paths and protection paths.

The above state will be further explained by referring to FIGS. 18 and 19. FIG. 18 shows how to establish a downstream working path (bold line) and a protection path (bold broken line) in the FIG. 17 setup. FIG. 19 shows an established upstream working path (bold line) and a protection path (bold dotted line) in the FIG. 17 setup. The same reference numerals and suffixes indicate the same parts in FIGS. 18 and 19 as those in FIG. 17. Although the nodes 103 and 104 are illustrated as they are necessary for description, the nodes 105 and 106 are not shown. The reference 101a indicates a segment of the counterclockwise ring transmission line 101 which is allocated to a working path, and 101r the rest of the line where no path is established. The reference designation 102b indicates the part of the clockwise ring transmission line 102 which is allocated to a working path, and 102r the rest of the line where no path is established. The reference 101b indicates a part of the counterclockwise line 101 which is allocated to a protection path. The paths are established at nodes 103, 104, 105 and 106 by writing-in a table (a link map) which instructs where a packet or a cell having a path ID number for the line should be outputted (such as a ring line or a node output terminal) when inputted at the nodes 103, 104, 105 and 106.

(2) An example of establishing a downstream working path and a protection path.

In FIG. 18, a downstream path is established between the nodes 103 and 104 in the manner described below. Explanation will be omitted for establishing working paths as they are similar to those in FIG. 17. (From the input terminal 103; of the node 103, to the insertion branch 103A.D, to a counterclockwise ring transmission line 101, to the branch 104D, to the multiplexer 104M and to the output terminal 104O of the node 104). A protection path is established on the clockwise line 102 in FIG. 18. At the node 104, the ring path is cut off with an insertion branch 104A.D (as shown by a mark X in the figure), and the multiplexer 104M combines the working path with a packet or a cell to be outputted to the output terminal 104O.

The reason why the protection path should be cut off will now be explained. Once a ring path is established, if a packet or a cell having the path ID number to indicate the ring path line is generated for one reason or another (such as an error in the line or an error in node processing), it will circulate on the ring path forever. This will immediately lead to an increase of the circulating packets or cells to eventually limit the available line space. In order to prevent this, the ring path is blocked off.

The same path ID number is allocated to both the working and the protection paths for the downstream transmission line. This enables connection to a protection path without the necessity of changing the path ID number even if the ring line 101 with a working path established thereon is connected by a loop-back with the ring line 102 with a protecting path established thereon as a single transmission line.

(3) An example of establishing an upstream working path and a protection path.

Similarly, the upstream path will be established between the nodes 103 and 104 in FIG. 19. Explanation is omitted for establishing a working path as it is similar to those given in relation to F1G. 17. (From the input terminal 104; of the node 104 to the insertion branch 104A.D, to a clockwise ring transmission line 102, to the branch 103D, to the multiplexer 103M and to the output terminal 103O). A protection path is established on the counterclockwise ring line 101 in FIG. 19. The ring path is cut off at the node 103 with the insertion branch 103A.D (noted with the X mark in FIG. 19). The packet or the cell is multiplexed with the working path by the multiplexer 103M to be outputted to the node output terminal 103O. The same path ID number is assigned to both the working path and the protection path in the upstream line in a manner to avoid duplication with the path ID number indicating the downstream line. This is essential for preventing the coupling of an upstream path with a downstream path when a transmission line is looped back.

A loop-back operation will now be described.

(4) An example of a loop-back operation when a failure takes place on a working path (recovery of a downstream path).

The recovery sequence for a downstream loop-back will be described by referring to FIG. 20 where a disconnection takes place on the ring transmission lines 101 and 102 between the nodes 103 and 104 under the conditions where paths are established as shown in FIG. 19 and a loop-back is made on both sides of the point 110. In other words, when a failure is detected by signals received from the transmission line such as by a lowering of the level of the received signal or sending of the receiving timing signals, etc.), the line is switched to the other ring transmission line of the opposite direction; in other words, dual opposing ring lines are corrected. For this purpose, even if one of the transmission lines is normal, it is switched to the other ring transmission line and therefore becomes disconnected. This in turn disconnects the receiving side of the ring in the normal side, requiring a loop-back. Loopback may be made on both sides of the disconnected point (a loop-back point 110). The same numbers are allocated to the working paths of the counterclockwise ring transmission line 101 and the protection paths on the clockwise ring transmission line 102, so it can be connected to a protection path without the necessity of changing the path ID number for the transmission line thereof.

As a result, the loop-back path extends from the input terminal 103; of the node 103 to the insertion branch 103A.D., to the portion allocated, to the working paths 101a of the counterclockwise ring transmission line 101, to the disconnected point 110, to the portion allocated to the protection paths 102b of the clockwise ring transmission line 102, to an insertion branch 104A.D., to the multiplexer 104M and to the output terminal 104O of the node 104, and the line may be recovered from failure by means of the portion allocated to the protection paths. The path is cut off from the connection (extending from the point (X) where the path is disconnected by the insertion branch 104A.D. to the loop-back point 110, due to disconnection to the branch 104D to the multiplexer 104M) has no incoming paths, there is no adverse effect to the recovered path.

(5) An example of loop-back operation for a failure on working path (Recovery of an upstream path).

The recovery sequence with the downstream loop-back will be explained referring to FIG. 21., which shows a state where a disconnection takes place on the ring lines 101 and 102 between the nodes 103 and 104 with the paths established as shown in FIG. 18 and a loop-back is made on both sides of the point 110. Explanation is omitted for the loop-back as the description made in relation to the downstream path recovery is applicable simply by replacing the ring line 102 with the line 101, the node 103 with the node 104 and the node 104 with the node 103 and the right-left relation reversed.

As stated in the foregoing, the path can recover from failures quickly back without the necessity of sending a control signal between nodes.

An example of operation for recovery of a failure in a protection path will now be described.

(6) An example of operation at the time of a failure in a protection path (A downstream path)

FIG. 22 shows an example of a failure on a protection path of the downstream clockwise line 102. FIG.22 shows a case where a line connecting the ring lines 101 and 102 is cut by a failure between the nodes 103 and 104 under the conditions shown in FIG. 18. By this method, a path can be secured without affecting the current working path (which runs from an input terminal 103; of the node 103 to an insertion branch 103A.D, to the counterclockwise ring line 101, to a branch 104D, to a multiplexer 104M and to an output terminal 1040 of the node 104. When the line is looped back on both sides of the point 120, the protection path on the clockwise line 102 may be connected to the remaining portion 101r of the counterclockwise line 101 which has not been allocated to the working path. But as the portion 101r is not given a path ID number indicating the working path, the connection with the working path is not made. This prevents the working path from being affected by a line failure, if occurring, on the protection path.

(7) An example of operation at the time of a failure in a protection path (An upstream path)

FIG. 23 shows a case of a line failure which takes place on a protection path of the upstream or counterclockwise line 101. FIG. 23 shows a case where the connection between lines 101 and 102 is cut by a failure between the nodes 103 and 104 and the line is recovered by making a loop-back on both sides of the point 120. As the operation for this is similar to the operation described in (6) relative to the downstream path if the line 101 is replaced with the line 102, the line 102 with the line 101, the node 103 with the node 104, and the node 104 with the node 103, and the right-left relation reversed, the description is therefore omitted.

The description on the nodes 103 and 104 is applicable to the nodes 105 and 106 as well as to multi-node rings. Paths can be established in a manner to allow an arbitrary recovery with a loop-back simply by assigning paths with path ID numbers without duplication.

Figure 20:
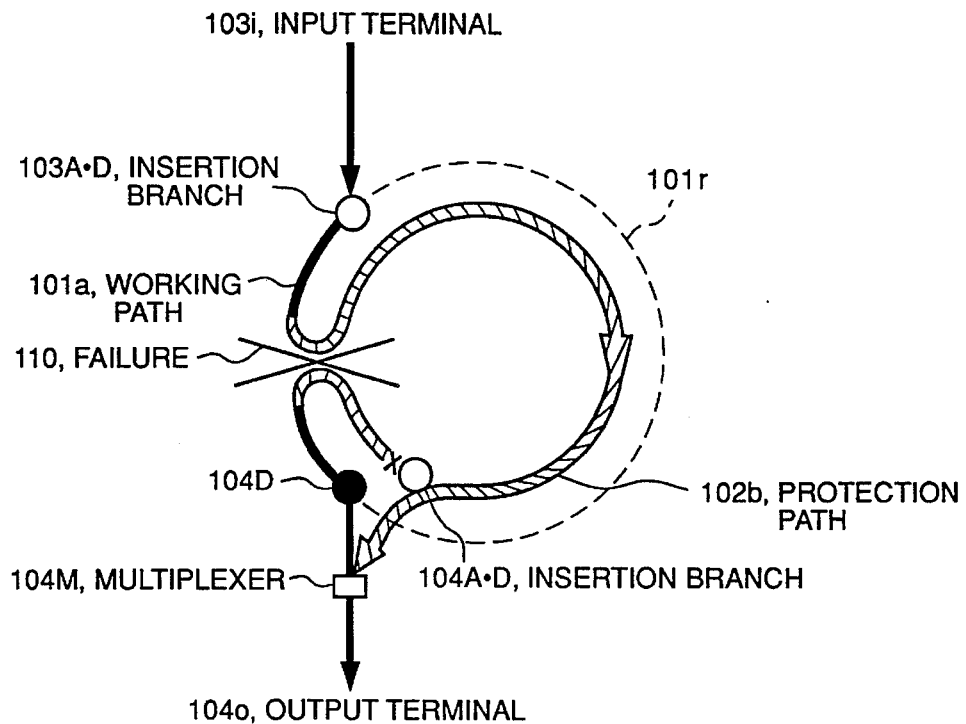
FIG. 20 is a view to show an example of loop-back recovery in the downstream direction.
Figure 21:
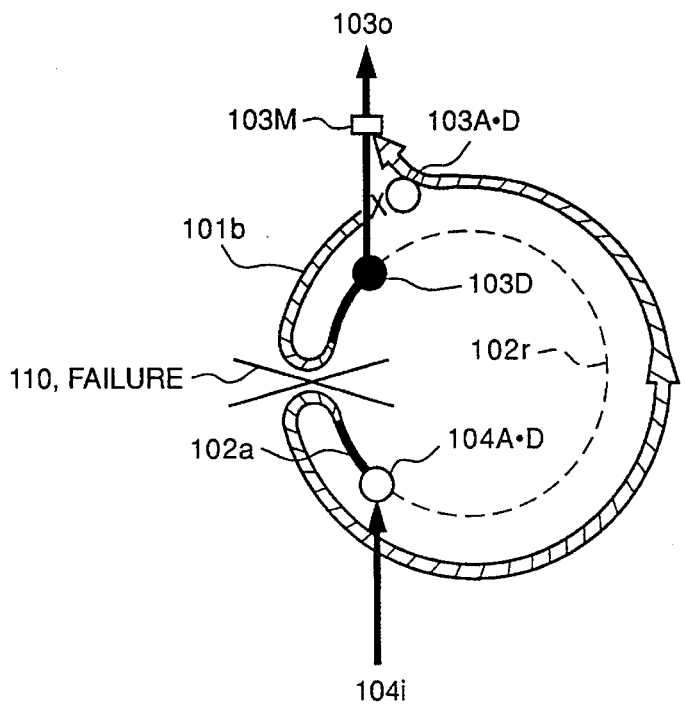
FIG. 21 is a view to show an example of loop-back recovery in the upstream direction.
Figure 25:
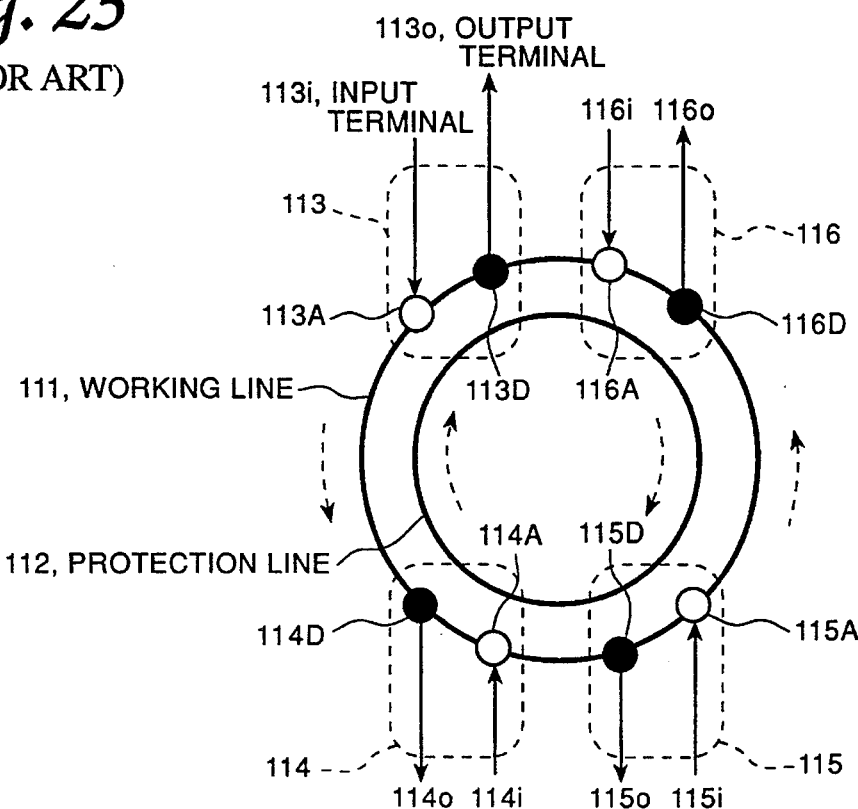
FIG. 25 is a view to show s structure of a prior art ring network.
Figure 26:
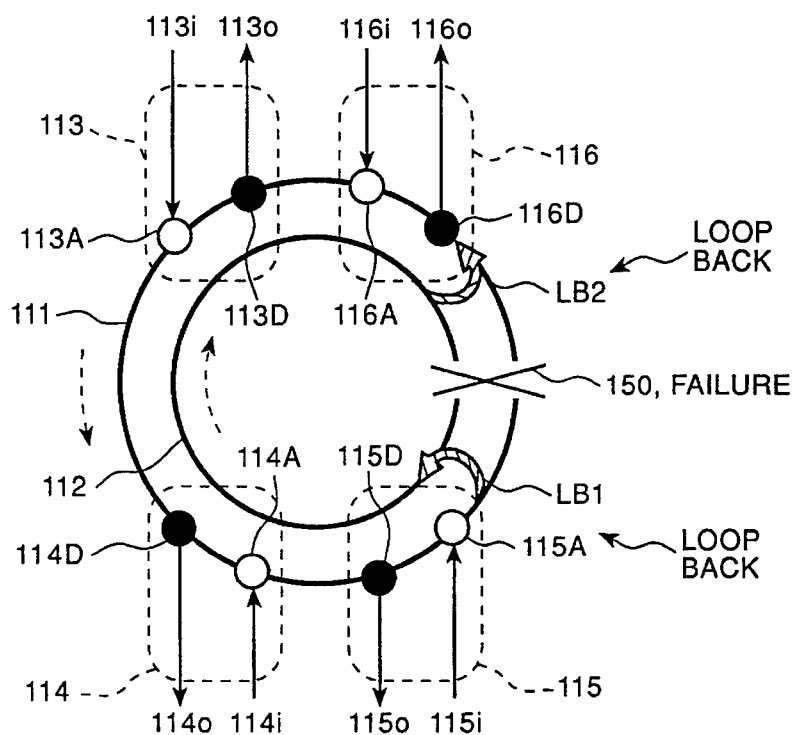
FIG. 26 is a view to show an example of a recovery with loop-back from a failed line on the prior art ring network.

(8) An example of operation at the time of double failures on a multiplexed transmission line This is the case where the state indicated in FIG. 20 and that indicated in FIG.22 or the state indicated in FIG. 21 and that indicated in FIG. 23 simultaneously take place (the points 110 and 120 from which the loop-backs are made). In this case, both the working path and protection path are cut off, and the line cannot be recovered by making a loop-back and it may be formed undesirable abnormal paths. However, in respect to the down directing paths, the connection with the working path cannot be made as the portion 101r of the counterclockwise line 101 which has been allocated to the working path is not given a path ID number. In respect to the up directing paths, because the path ID number indicating the working line is not given to the rest of the portion 102r of the line 102, the connection can not be made to a working path and therefore unnecessary path connection will not be made.

If the path is looped back at sides of the point 120 to establish a path, and if a packet or a cell arrives at the terminal 130 or 140 where any path is not yet established, it will be erased as no path is set up. But by finding out the path ID number indicating the line of the packet or the cell, the path which has failed can be identified.

Although for the nodes 103 and 105, an insertion branch is arranged on the counterclockwise line 101 and a branch is arranged in the clockwise line 102, and the arrangement is reversed for the nodes 104 and 106, the insertion branch and the branch may be replaced with one another in the arrangement to effect a similar path establishment.

In this case, however, as working paths are established only on the working line, the shortest path cannot be established, and the longest path has to be made even for the adjacent nodes. Therefore, a path with due consideration on delay time cannot be established. In order to enable establishment of the shortest path, both ring transmission lines are provided with working paths and the protection paths in the unit of a path. For this purpose, the working paths or protection paths are identified from their path ID numbers, the path is looped back from a working path to a protection path, but the path is not looped back from the protection path to the working path. Such a case will be described by referring to FIG. 24.

In this case, the ring transmission line is made dual by the counterclockwise line 131 and the clockwise line 132 and the nodes 133 through 136 are arranged on the lines. The node 133 is provided with an input terminal 133; an output terminal 1330, and an insertion branch 133A.D. which sends out information toward the transmission line and branches information therefrom, a branch 133D for receiving information from the ring transmission line, and a multiplexer 133M for connecting a working path with a protection path. The nodes 134, 135 and 136 are similarly provided with input terminals 1341; 135; and 136; output terminals 1340, 1350, and 1360, insertion branch points 134AD, 135AD and 136AD, branches 134D, 135D and 136D, and multiplexers 134M, 135M, and 136M. Identifiers are provided to distinguish a working path from a protection path in each of the link map tables for respective nodes 133 through 136 so that if it is identified as a protection path, no loop-back is made.

In such a construction, the node 136 is designated as a transmission node and the node 135 as a receiving node, and a working path is established on the counterclockwise line 131 and a protection path on the clockwise line 132. It is assumed that in addition to a failure taking place between the nodes 134 and 135, a line failure takes place also between the nodes 133 and 136. If paths with the same ID numbers are looped back alone, a closed ring path will be formed among the nodes 133 and 134, the point 130, the nodes 134 and 133, the point 140, and the node 133. Therefore, the working paths and the protection paths are identified respectively in the nodes 134 and 133, and connection from the working path toward the protection paths is made while the connection from the protection paths toward the working paths is prohibited. This forms a path extending from the node 133 to the node 134, to the point 130, to the node 134, to the node 133 and to a terminal where no path is established. Therefore, packets or cells would not circulate in the paths. As no paths are established in the remaining portion 131r of the counterclockwise line 131, no closed ring path is formed even if two or more loop-back points are formed in that portion.

Although in the foregoing statement the loop-back method using packets or cells is described, this invention is applicable to a synchronous transmission method (STM) using a synchronized frame structure by using the portion from s frame signal as a path ID number for the transmission path. For this case, a multiplexer should be a synchronous frame multiplexer which connects transmitted information within a synchronous frame by logical OR, and the transmitted information within the synchronized frame on the side of transmitter which is cut off by an insertion branch of a protection path is all made logical [0]. Although the network topology is indicated in the form of a ring in the foregoing statement, this invention may be applied to the portions which can be divided into adjacent rings of a mesh network.

As stated above, this invention loop-back method is most advantageous in that a failure may be recovered by loop-back without controlling the nodes related to the failure after the transmission line has been cut. This allows a loop-back recovery at a high speed. This also means that a high speed recovery is made easy because the method does not involve a complicated procedure. The invention method is constructed simply by providing a function to detect line failures as well as a protection path at line terminals of respective nodes.

What is claimed is:

1. A loop-back method for a dual ring network which loops back information between two ring lines of opposite transmission directions, for transmitting the information to a path indicated by a path ID number or a time slot position from a periodic frame, comprising the steps of:

establishing a working path on a first of said two ring lines, between a transmission node and a receiving node, said working path having an inlet and outlet for transferring information to and from the ring network;

establishing a protection path on a second of said two ring lines, extending from a first node which is at or adjacent said receiving node, in a direction opposite to that of the working path, said protection path being in the form of a open ring and having an inlet and outlet for transferring information to and from the ring network;

multiplexing, at said receiving node, signals provided to said outlet of the protection path with signals provided to said outlet of said working path; and detecting, in each node, a failure taking place on a line, and making a loop-back from a working path to the corresponding protection path in said node which detected the failure.

2. The loop-back method for a ring network as claimed in claim 1 wherein working paths are established on a predetermined one of said two ring lines.

3. The loop-back method for a ring network as claimed in claim 1 wherein each working path is established independently on either one of the two ring lines.

4. The loop-back method for a ring network as claimed in claim 2, wherein each protection path is assigned with a same ID number or position as that of the corresponding working path and the paths established in one of the two ring lines are looped back to the corresponding paths established in the other of the two ring lines.

5. The loop-back method for a ring network as claimed in claim 2 wherein each path is looped back separately.

6. The loop-back method for a ring network as claimed in claim 5 wherein information transmitted on said working path and obstructed by a line failure is looped back, but information transmitted on said protection path and obstructed by a line failure is not.

7. The loop-back method for a ring network as claimed in claim 5 wherein protection paths which are inputted from the side of the failed line are discarded.

8. The loop-back method for a ring network as claimed in claim 1 wherein loop-back is made at an upstream node on the failed transmission line.

9. A ring network, comprising:

at least two ring lines having different transmission directions and plural nodes, each of said at least two ring lines including information inlet and outlet means arranged thereon for inputting information to and outputting information from said at least two ring lines, wherein information transmitted along a first of said at least two ring lines proceeds in a first direction, wherein a working path is established on a first of said two ring lines, between a transmission node and a receiving node, and a protection path is established on a second of said two ring lines, independent of said working path and extending from a first node, at or adjacent said receiving node, in a direction opposite to that of the working path, said protection path being in the form of an open ring so that information output from said protection path is not directly input back into said protection path;

means, at said receiving node, for multiplexing signals provided from an outlet of said first of said at least two ring lines with signals provided from an outlet of a second of said at least two ring lines;

each of said plural nodes including means for looping-back the information on said first of said at least two ring lines, when a failure is detected thereon, to said second of said at least two ring lines in a second direction, opposite to said first direction.

10. A ring network as in claim 9 wherein each of the plural nodes includes means for connecting transmitted information to a path indicated by a path ID number in the information.

11. A ring network as in claim 10 wherein said looping back means includes means for setting a same path ID number as a working path and as a protection path, and choosing the protection path when said failure is detected.

12. A ring network as in claim 9, wherein said first ring line is a working path and said second ring line is a protection path.

13. A loop-back method for a dual ring network which loops back information between two ring lines of opposite transmission directions, for transmitting the information to a path indicated by a path ID number or a time slot position from a periodic frame, comprising the steps of:

establishing a working path on a first of said two ring lines, between a transmission node and a receiving node;

establishing a protection path on a second of said two ring lines, independent of said working path and extending from a first node, at or adjacent said receiving node, in a direction opposite to that of the working path, said protection path being in the form of an open ring so that information output from said protection path is not directly input back into said protection path;

multiplexing, at said receiving node, signals provided to a receiving terminal of the protection path with signals provided to a receiving terminal of said working path;

detecting at each node a failure taking place on said first of said two ring lines, and making a loop-back from said working path to the corresponding protection path in said node which detected the failure;

assigning each possible route on said protection path a same ID number or position as that of the corresponding route on said working path, with all routes on one path looped back to the corresponding routes on the other path.

14. A loop-back method as in claim 13, wherein said working path and said protection path possess information inlet and outlets means for inputting information to and outputting information from said two ring lines.

15. A loop-back method as in claim 14, wherein said information outlet means of said working path is multiplexed together with said information outlet means of said protection path.

16. A loop-back method for a dual ring network which loops back information between two ring lines of opposite transmission directions, for transmitting the information to a path indicated by a path ID number or a time slot position from a periodic frame, comprising the steps of:

establishing a working path on a first of said two ring lines, between a transmission node and a receiving node, said working path having an inlet and outlet for transferring information to and from the ring network;

independently establishing a protection path on a second of said two ring lines, independent of said working path and extending from a first node, at or adjacent said receiving node, in a direction opposite to that of the working path, said protection path being in the form of an open ring and having an inlet and outlet for transferring information to and from the ring network, said protection path designed so that information output from said protection path is not directly input back into said protection path;

multiplexing, said receiving node, signals provided to said outlet of the protection path with signals provided to said outlet of said working path; and detecting at each node a failure taking place on said two ring lines, and separately looping-back said working path and protection path.

17. The loop-back method for a ring network as claimed in claim 16 wherein information transmitted on said working path and obstructed by a line failure is looped back, but information transmitted on said protection path and obstructed by a line failure is not.

18. The loop-back method for a ring network as claimed in claim 16 wherein protection paths which are inputted from the side of the failed line are discarded.

19. A loop-back method for a dual ring network which loops back information between two ring lines of opposite transmission directions, for transmitting the information to a path indicated by a path ID number or a time slot position from a periodic frame, comprising the steps of:

establishing a working path on a first of said two ring lines, between a transmission node and a receiving node, said working path having an inlet and outlet for transferring information to and from the ring network;

establishing a protection path on a second of said two ring lines, extending from a first node, at or adjacent said receiving node, in a direction opposite to that of the working path, said protection path having an inlet and outlet for transferring information to and from the ring network and being in the form of an open ring so that information output from said protection path is not directly input back into said protection path;

multiplexing, at said receiving node, signals provided to said outlet of the protection path with signals provided to said outlet of said working path; and detecting at each node a failure taking place on said two ring lines, and making a loop-back at nodes on both sides of a location where said failure occurs, with a first loop-back transferring information from the working path to the protection path upstream of the location where said failure occurs, and a second loopback transferring information from the protection path to the working path downstream of the location where said failure occurs.

20. A loop-back method for a dual ring network which loops back information between two ring lines of opposite transmission directions, for transmitting the information to a path indicated by a path ID number or a time slot position from a periodic frame, comprising the steps of:

independently establishing a working path on a first of said two ring lines, between a transmission node and a receiving node, said working path having an inlet and outlet for transferring information to and from said ring network;

establishing a protection path on a second of said two ring lines, extending from a first node, at or adjacent said receiving node, in a direction opposite to that of the working path, said protection path having an inlet and outlet for transferring information to and from the ring network and being in the form of a open ring so that information output from said protection path is not directly input back into said protection path;

multiplexing, at said receiving node, signals provided to said outlet of the protection path with signals provided to said outlet of said working path; and detecting at each node a failure taking place on said two ring lines, and separately looping-back a route on said working path to its corresponding route on said protection path at said node which detected the failure; and providing a table which includes path ID information, allowing for the retrieval of connection information using said path ID information.

21. A ring network, comprising:

at least two ring lines of different transmission directions, with plural nodes and information inlet and outlet means arranged on the ring lines, wherein information is transmitted along a first of said two ring lines in a first direction, with said first of said two ring lines having inlet and outlet means for transferring information to and from the ring network;

means for transferring said information from said first of said two ring lines to a second of said two ring lines in a second direction opposite to said first direction and extending from a receiving node or an adjacent node upstream to said receiving node, said second of said two ring lines having inlet and outlet means for transferring information to and from the ring network;

means, at said receiving node, for multiplexing signals provided from an outlet of said first of said two ring lines with signals provided from an outlet of said second of said two ring lines;

each of said plural nodes including means for loopingback the information on said first of said two ring lines, when a failure is detected thereon, to said second of said two ring lines;

wherein said transferring means includes a link map storing labels for determining a transfer at each of said nodes; and processing means for determining an identification number of a current communication and for accessing said link map with said identification number to determine said transfer.

22. A ring network as in claim 21 wherein each of the plural nodes includes means for transferring transmitted information to a path indicated by a path ID number in the information.

23. A ring network as in claim 22 wherein said looping back means includes means for setting a same path ID number as a working path and as a protection path, and choosing the protection path when said failure is detected.

* * * * *